(12) United States Patent
Kantor et al.

(10) Patent No.: US 9,875,454 B2
(45) Date of Patent: Jan. 23, 2018

(54) ACCOMMODATING MOBILE DESTINATIONS FOR UNMANNED AERIAL VEHICLES

(71) Applicant: Verizon Patent and Licensing Inc., Arlington, VA (US)

(72) Inventors: Igor Kantor, Raleigh, NC (US); Ashok N. Srivastava, Mountain View, CA (US); Douglas M. Pasko, Bridgewater, NJ (US); Hani Batla, Teaneck, NJ (US); Gurpreet Ubhi, Nutley, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 771 days.

(21) Appl. No.: 14/282,456

(22) Filed: May 20, 2014

(65) Prior Publication Data

US 2016/0196525 A1 Jul. 7, 2016

(51) Int. Cl.
*G06Q 10/08* (2012.01)
*G08G 5/00* (2006.01)
(Continued)

(52) U.S. Cl.
CPC ......... *G06Q 10/083* (2013.01); *B64C 39/024* (2013.01); *G08G 5/0013* (2013.01);
(Continued)

(58) Field of Classification Search
CPC ......... B64C 39/024; B64C 2201/00–2201/18; B64C 2201/128; B64C 2201/146;
(Continued)

(56) References Cited

U.S. PATENT DOCUMENTS 8,178,825 B2 * 5/2012 Goossen ................. F41G 7/303
244/3.1
9,051,043 B1 * 6/2015 Peeters ................... B64C 19/00
(Continued)

OTHER PUBLICATIONS

Redding et al., "Distributed Multi-Agent Persistent Surveillance and Tracking with Health Management", American Institute Aeronautics and Astronautics, AIAA Guidance, Navigation, and Control Conference, 2011, 18 pages.
(Continued)

*Primary Examiner* — Courtney Heinle

(57) ABSTRACT

A device receives a request for a flight path for a UAV to travel from a location to an anticipated location associated with a mobile device, and determines capability information for the UAV based on component information associated with the UAV. The device receives information associated with a current location, a direction of travel, and a speed of the mobile device, and calculates the flight path from the location to the anticipated location associated with the mobile device based on the capability information and based on the information associated with the current location, the direction of travel, and the speed of the mobile device. The device generates flight path instructions for the flight path, and provides the flight path instructions to the UAV to permit the UAV to travel from the location to the anticipated location associated with the mobile device, based on the flight path instructions.

20 Claims, 11 Drawing Sheets

(51) Int. Cl.
*B64C 39/02* (2006.01)
*H04W 4/02* (2009.01)
*H04W 4/04* (2009.01)
*H04W 12/06* (2009.01)

(52) U.S. Cl.
CPC ......... *G08G 5/0034* (2013.01); *G08G 5/0039* (2013.01); *G08G 5/0043* (2013.01); *G08G 5/0069* (2013.01); *H04W 4/027* (2013.01); *H04W 4/046* (2013.01); *B64C 2201/128* (2013.01); *B64C 2201/146* (2013.01); *H04W 12/06* (2013.01)

(58) Field of Classification Search
CPC .. G06Q 10/083; G08G 5/0034; G08G 5/0039; G08G 5/0013; G08G 5/0043; G08G 5/0069; H04W 4/027; H04W 4/046; H04W 12/06
See application file for complete search history.

(56) References Cited

U.S. PATENT DOCUMENTS

| | | | |
|---|---|---|---|
| 9,164,506 B1* | 10/2015 | Zang | G05D 1/0038 |
| 9,244,147 B1* | 1/2016 | Soundararajan | G01S 1/44 |
| 9,262,929 B1* | 2/2016 | Roy | G08G 5/0034 |
| 2006/0015247 A1* | 1/2006 | Speer | G01C 21/00 701/467 |
| 2009/0157233 A1* | 6/2009 | Kokkeby | G01S 3/7864 701/3 |
| 2009/0187299 A1* | 7/2009 | Fregene | G05D 1/0094 701/23 |
| 2010/0250022 A1* | 9/2010 | Hines | G05D 1/0094 701/2 |
| 2010/0323715 A1* | 12/2010 | Winters | G01S 5/0027 455/456.1 |
| 2012/0030133 A1* | 2/2012 | Rademaker | G06Q 10/08 705/333 |
| 2012/0143808 A1* | 6/2012 | Karins | G06N 7/005 706/46 |
| 2012/0287274 A1* | 11/2012 | Bevirt | H04N 7/185 348/144 |
| 2012/0307042 A1* | 12/2012 | Lee | G08G 5/0069 348/114 |
| 2013/0240673 A1* | 9/2013 | Schlosser | G05D 1/101 244/137.1 |
| 2014/0022051 A1* | 1/2014 | Levien | A61M 5/20 340/5.2 |
| 2014/0032034 A1* | 1/2014 | Raptopoulos | G08G 5/0069 701/25 |
| 2014/0254896 A1* | 9/2014 | Zhou | B25J 9/0006 382/124 |
| 2015/0097950 A1* | 4/2015 | Wang | H04N 5/23287 348/144 |
| 2015/0120094 A1* | 4/2015 | Kimchi | B64C 39/024 701/3 |
| 2015/0142211 A1* | 5/2015 | Shehata | H04N 7/181 701/2 |
| 2015/0278759 A1* | 10/2015 | Harris | G06Q 10/08355 705/338 |
| 2015/0293225 A1* | 10/2015 | Riley | G05D 1/0684 356/4.01 |
| 2015/0302495 A1* | 10/2015 | Stuckman | G01S 1/00 705/26.35 |
| 2015/0317597 A1* | 11/2015 | Shucker | G06Q 10/083 235/375 |
| 2015/0332206 A1* | 11/2015 | Trew | G06Q 10/0836 705/330 |
| 2015/0356501 A1* | 12/2015 | Gorjestani | H04W 4/02 705/333 |
| 2015/0370251 A1* | 12/2015 | Siegel | G05D 1/0027 701/2 |
| 2016/0012393 A1* | 1/2016 | Wang | G06Q 10/08355 705/338 |
| 2016/0012411 A1* | 1/2016 | Kursun | G06Q 20/3221 705/42 |
| 2016/0068264 A1* | 3/2016 | Ganesh | G08G 5/0069 701/2 |
| 2016/0068265 A1* | 3/2016 | Hoareau | B64C 39/024 701/3 |

OTHER PUBLICATIONS

Richards et al., "Model Predictive Control of Vehicle Maneuvers with Guarenteed Completion Time and Robust Feasibility", American Control Conference, 2003, Proceedings of the 2003, vol. 5, IEEE, 2003, 7 pages.
Park et al., "Agent Technology for Coordinating UAV Target Tracking", Knowledge-Based Intelligent Information and Engineering Systems, Springer Berlin Heidelberg, 2005, 8 pages.
Kuwata et al., "Three Dimensional Receding Horizon Control for UAVs", AIAA Guidance, Navigation, and Control Conference and Exhibit, Aug. 16-19, 2004, 14 pages.
Alighanbari et al., "Filter-Embedded UAV Task Assignment Algorithms for Dynamic Environments", AIAA Guidance, Navigation, and Control Conference and Exhibit, Aug. 16-19, 2004, 15 pages.
Saad et al., "Vehicle Swarm Rapid Prototyping Testbed", American Institute of Aeronautics and Astronautics, Aerospace Conference and AIAA Unmanned . . . Unlimited Conference, 2009, 9 pages.
Richards et al., "Decentralized Model Predictive Control of Cooperating UAVs", 43$^{rd}$ IEEE Conference on Decision and Control, vol. 4, IEEE, 2004, 6 pages.
Bertuccelli et al., "Robust Planning for Coupled Cooperative UAV Missions", 43$^{rd}$ IEEE Conference on Decision and Control, vol. 3, IEEE, 2004, 8 pages.
Toksoz et al., "Automated Battery Swap and Recharge to Enable Persistent UAV Missions", AIAA Infotech@ Aerospace Conference, 2011, 10 pages.
How et al., "Multi-vehicle Experimental Platform for Distributed Coordination and Control", http://web.mit.edu/people/jhow/durip1.html, Apr. 1, 2004, 4 pages.
Chung Tin, "Robust Multi-UAV Planning in Dynamic and Uncertain Environments", Massachusetts Institute of Technology, 2004, 110 pages.
How et al., "Flight Demonstrations of Cooperative Control for UAV Teams", AIAA 3$^{rd}$ "Unmanned Unlimited" Technical Conference, Workshop and Exhibit, Sep. 20-23, 2004, 9 pages.
Wikipedia, "Waze", http://en.wikipedia.org/wiki/Waze, Mar. 30, 2014, 6 pages.
Choi et al., "Information deliver scheme of micro UAVs having limited communication range during tracking the moving target" The Journal of Supercomputing, vol. 66, Issue 2, 2013, pp. 950-972.
Boyd et al., "Convex Optimization", Cambridge University Press, 2004, 730 pages.

\* cited by examiner

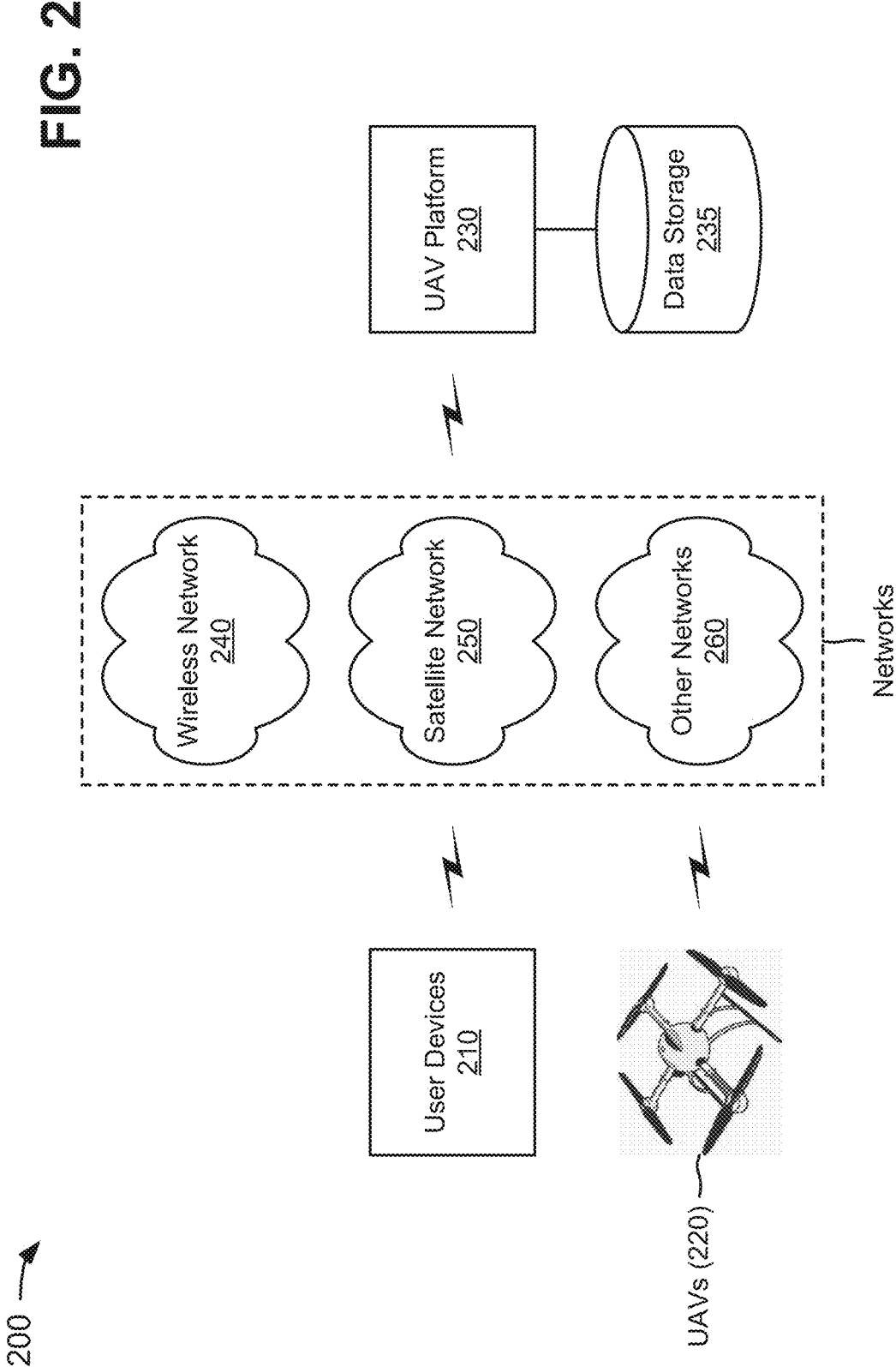

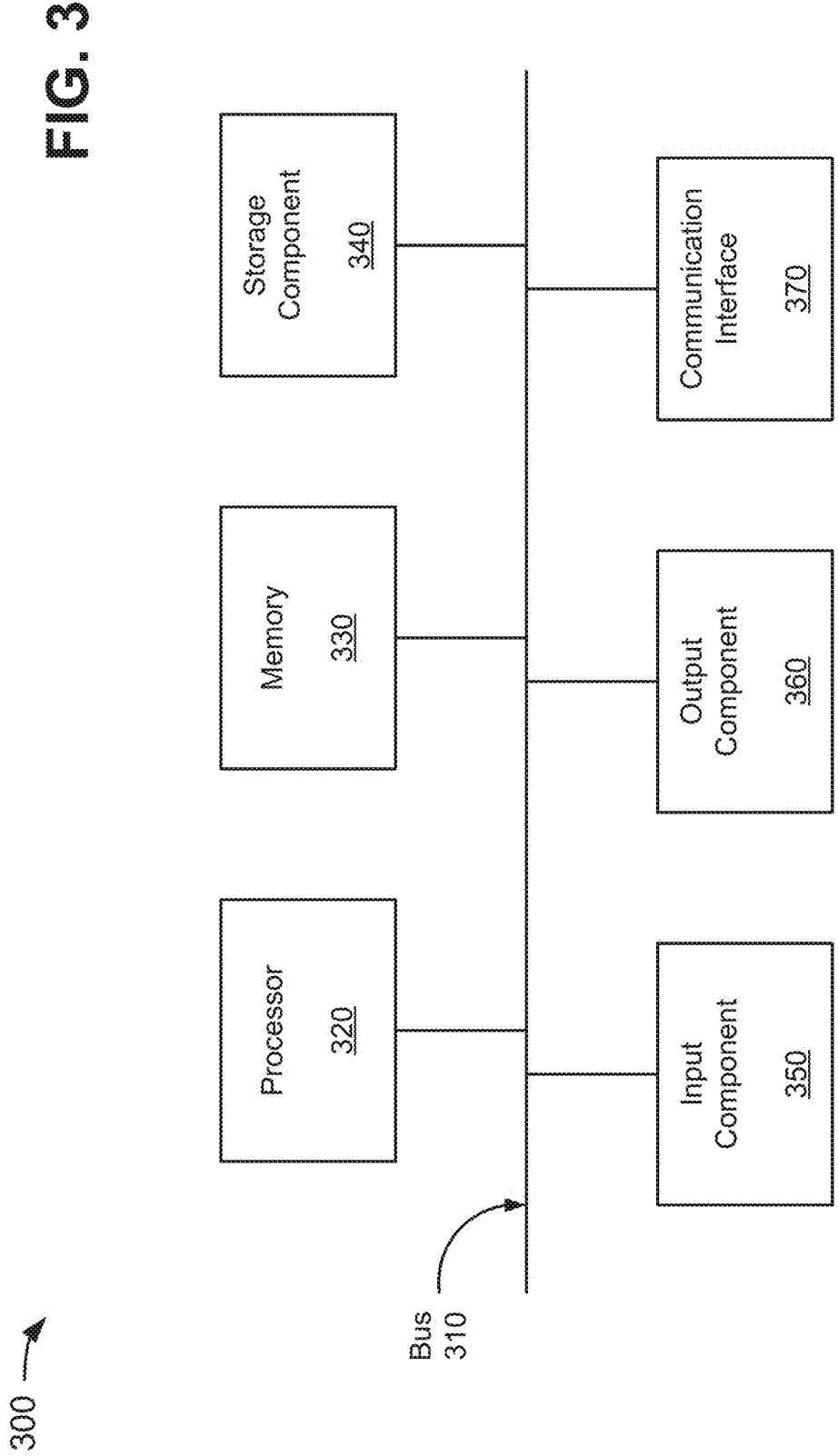

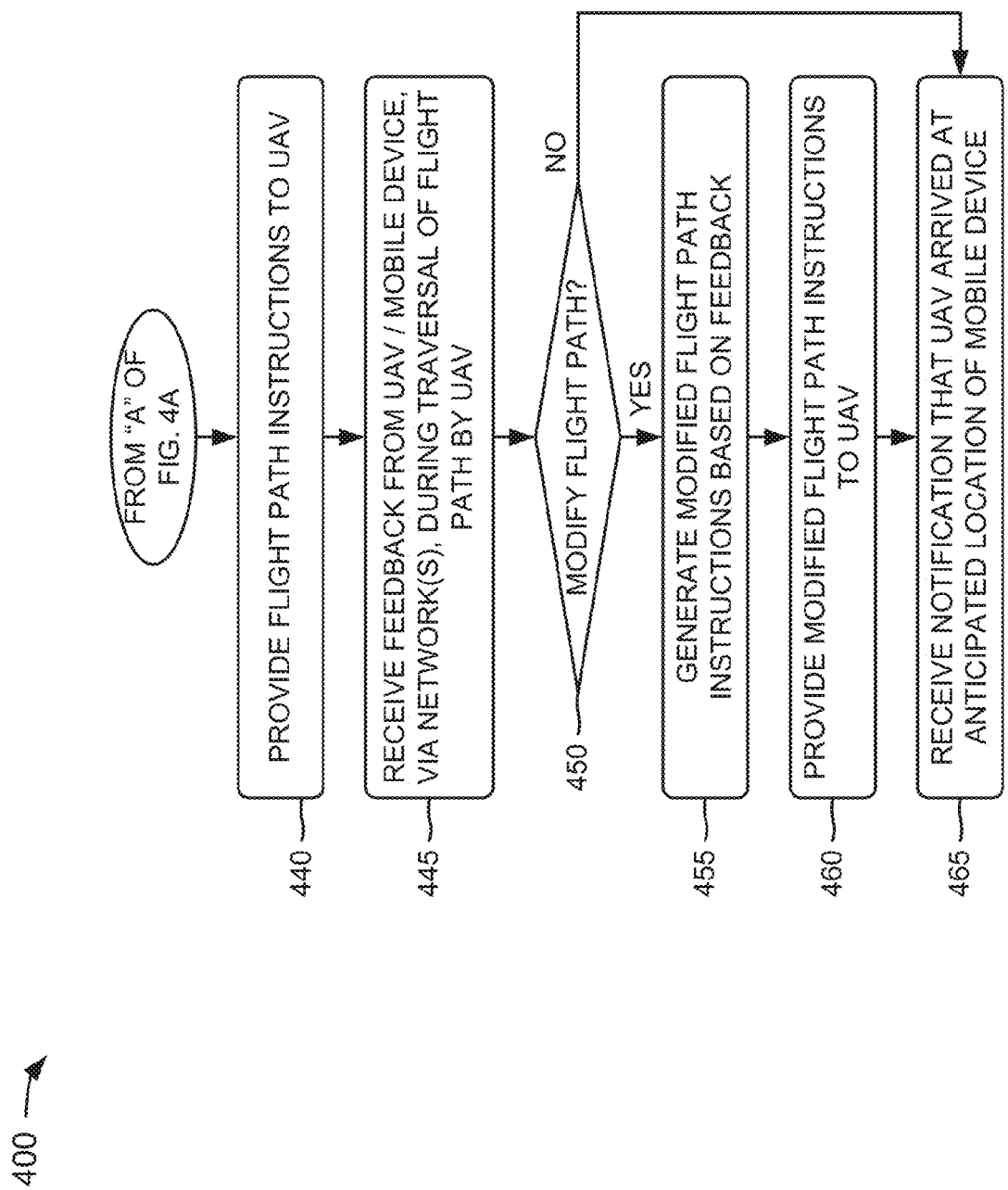

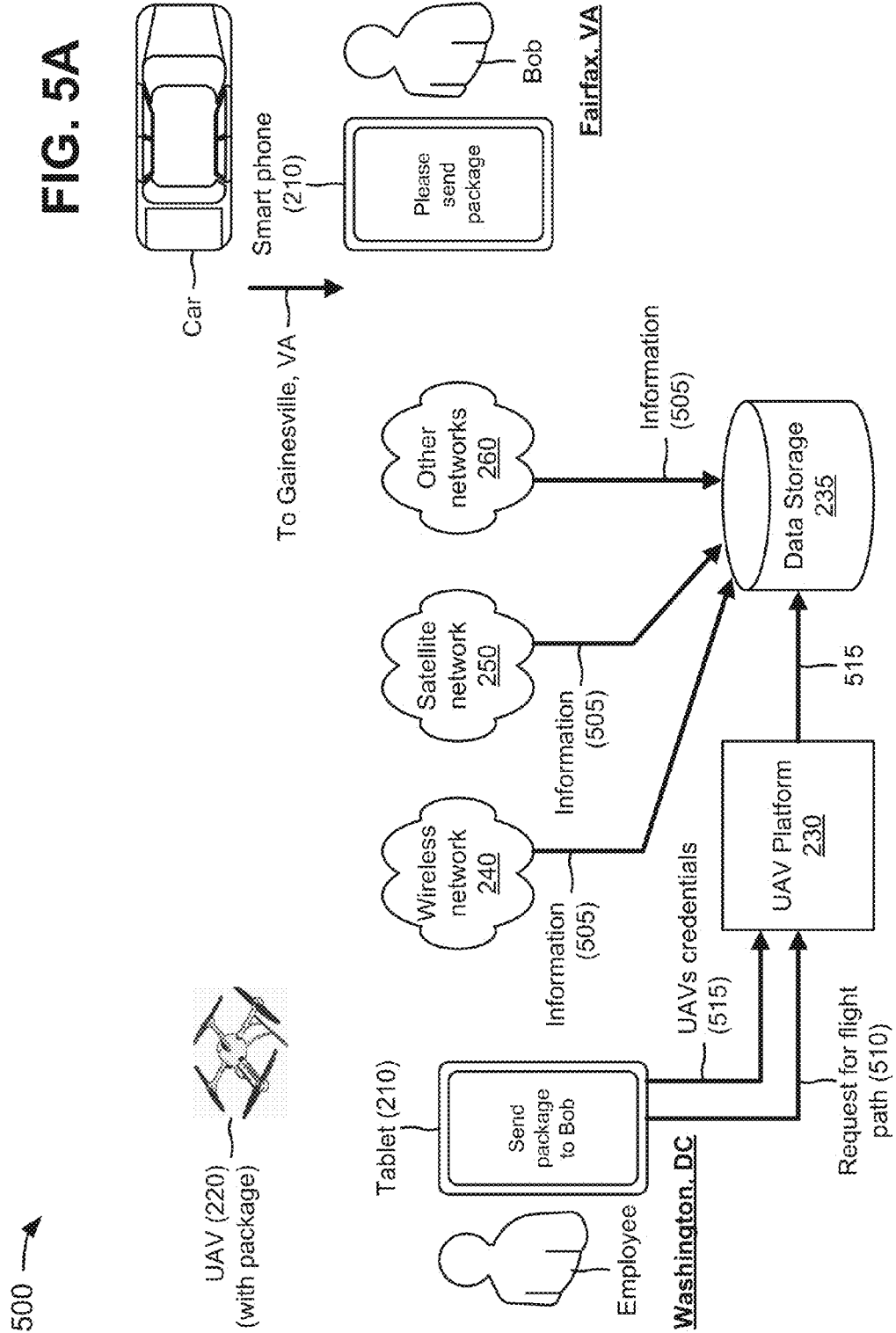

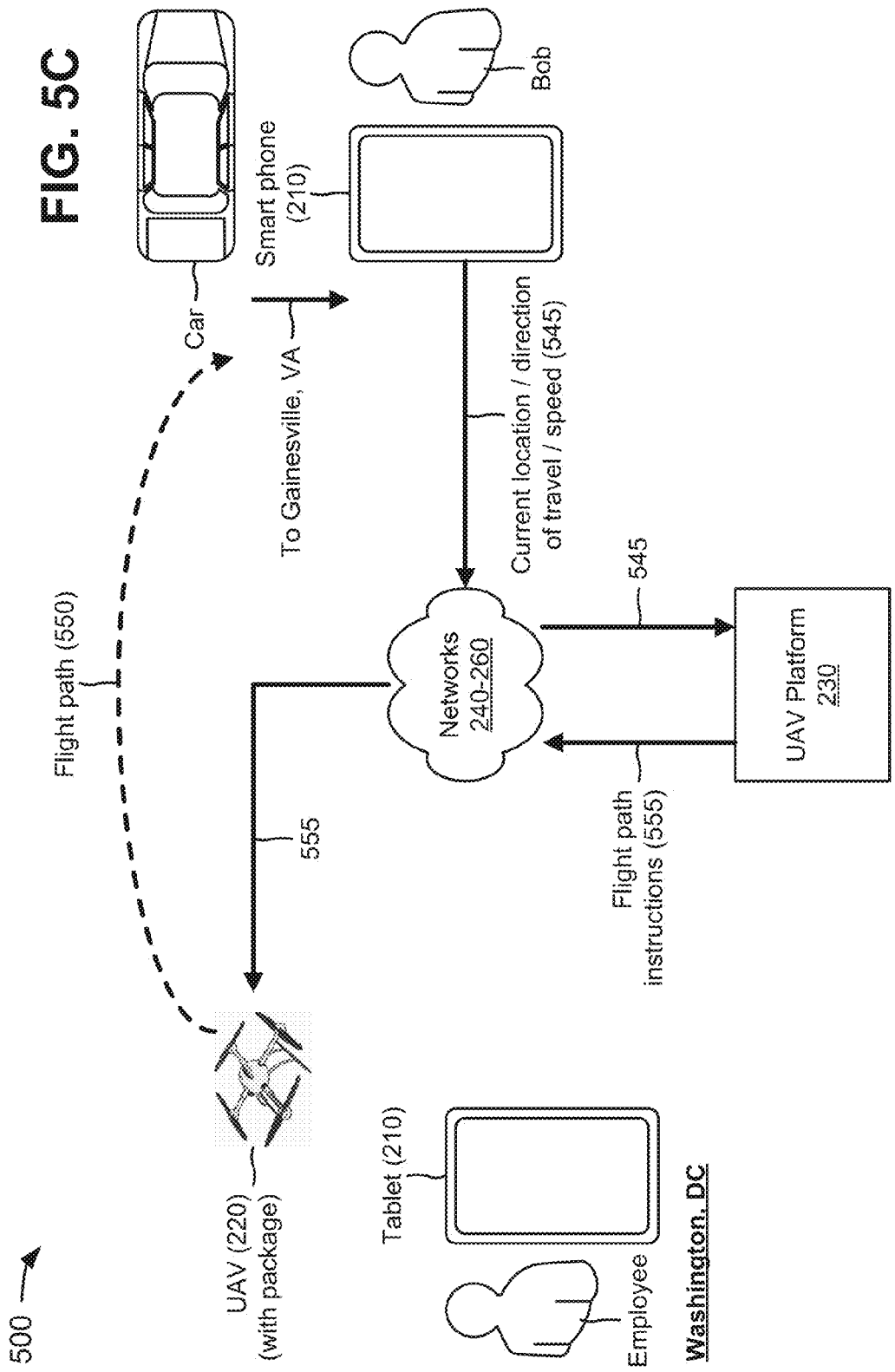

ACCOMMODATING MOBILE DESTINATIONS FOR UNMANNED AERIAL VEHICLES

BACKGROUND

An unmanned aerial vehicle (UAV) is an aircraft without a human pilot aboard. A UAV's flight may be controlled either autonomously by onboard computers or by remote control of a pilot on the ground or in another vehicle. A UAV is typically launched and recovered via an automatic system or an external operator on the ground. There are a wide variety of UAV shapes, sizes, configurations, characteristics, etc. UAVs may be used for a growing number of civilian applications, such as police surveillance, firefighting, security work (e.g., surveillance of pipelines), surveillance of farms, commercial purposes, etc.

BRIEF DESCRIPTION OF THE DRAWINGS

FIG. 2 is a diagram of an example environment in which systems and/or methods described herein may be implemented;

FIG. 3 is a diagram of example components of one or more devices of FIG. 2;

FIGS. 4A and 4B depict a flow chart of an example process for determining a flight path for a UAV to a mobile destination; and FIGS. 5A-5E are diagrams of an example relating to the example process shown in FIGS. 4A and 4B.

DETAILED DESCRIPTION OF PREFERRED EMBODIMENTS

The following detailed description refers to the accompanying drawings. The same reference numbers in different drawings may identify the same or similar elements.

Some private companies propose using UAVs for rapid delivery of lightweight commercial products (e.g., packages), food, medicine, etc. Such proposals for UAVs may need to meet various requirements, such as federal and state regulatory approval, public safety, reliability, individual privacy, operator training and certification, security (e.g., hacking), payload thievery, logistical challenges, etc.

Figure 1A:
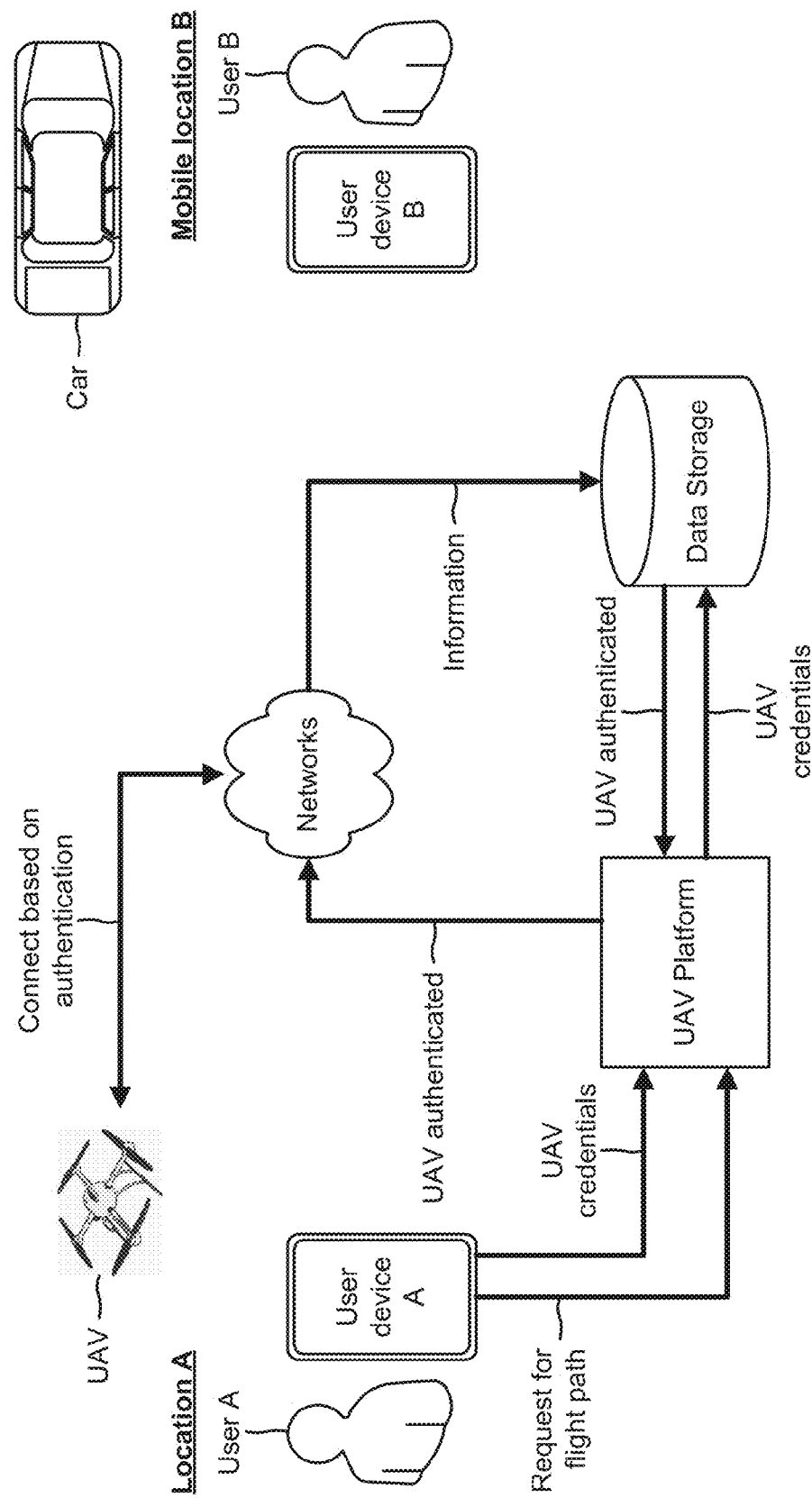
FIGS. 1A and 1B are diagrams of an overview of an example implementation described herein.
Figure 1B:
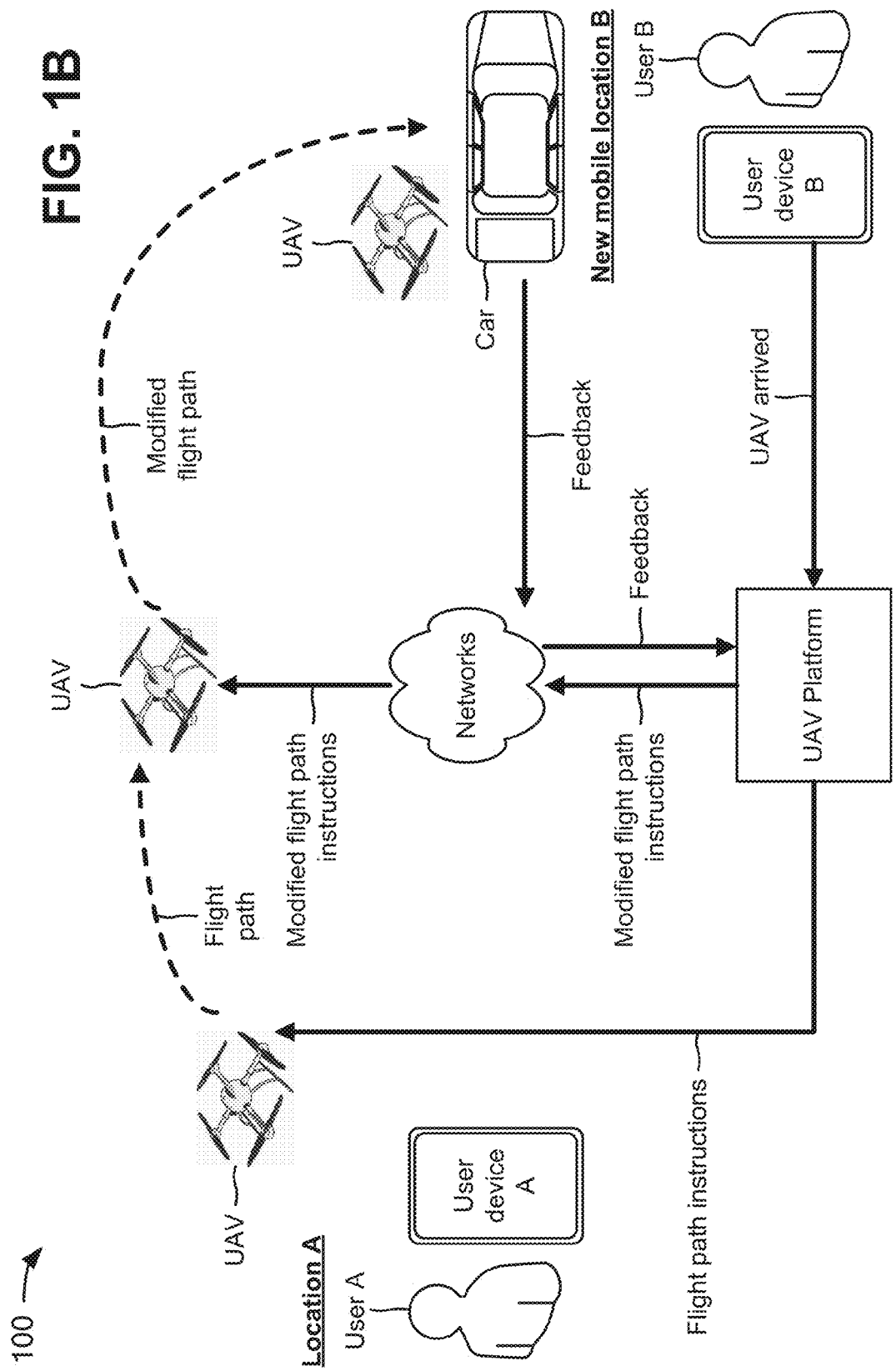

FIGS. 1A and 1B are diagrams of an overview of an example implementation 100 described herein. In example implementation 100, assume that a first user device (e.g., user device A) is associated with a first user (e.g., user A) that is located at an origination location (e.g., location A), as shown in FIG. 1A. Further, assume that user A wants to fly a UAV from location A to a mobile destination location in order to deliver a package to a second user (e.g., user B) associated with a second user device (e.g., user device B) and travelling in a car. As further shown in FIG. 1A, a UAV platform or system may be associated with data storage, and the UAV platform and the data storage may communicate with networks, such as a wireless network, a satellite network, and/or other networks. The networks may provide information to the data storage, such as capability information associated with UAVs (e.g., thrust, battery life, etc. associated with UAVs); weather information associated with a geographical region that includes geographical locations of location A, location B, and locations between location A and location B; air traffic information associated with the geographical region; obstacle information (e.g., buildings, mountains, etc.) associated with the geographical region; regulatory information (e.g., no fly zones, government buildings, etc.) associated with the geographical region; historical information (e.g., former flight paths, former weather, etc.) associated with the geographical region; etc.

As further shown in FIG. 1A, user A may instruct user device A (or the UAV) to generate a request for a flight path (e.g., from location A to a location of user device B) for the UAV, and to provide the request to the UAV platform. The request may include credentials (e.g., a serial number, an identifier of a universal integrated circuit card (UICC), etc.) associated with the UAV. The UAV platform may utilize the UAV credentials to determine whether the UAV is authenticated for utilizing the UAV platform and/or one or more of the networks, and is registered with an appropriate authority (e.g., a government agency) for use. For example, the UAV platform may compare the UAV credentials with UAV account information (e.g., information associated with authenticated and registered UAVs) provided in the data storage to determine whether the UAV is authenticated. Assume that the UAV is authenticated for the UAV platform, and that the UAV platform provides, to the networks, a message indicating that the UAV is authenticated. The UAV may connect with the networks based on the authentication of the UAV, as further shown in FIG. 1A.

The UAV platform may utilize information associated with the UAV (e.g., information regarding components of the UAV, the requested flight path, etc.) to identify capabilities of the UAV, and other information in the data storage. For example, the UAV platform may retrieve capability information associated with the UAV and/or other information (e.g., the weather information, the obstacle information, the regulatory information, the historical information, etc. associated with the geographical region) from the data storage. The UAV platform may calculate the flight path from location A to the location of user device B based on the capability information, the other information, and/or information associated with a current location, a direction of travel, and/or a speed of user device B. The UAV platform may generate flight path instructions for the flight path. For example, the flight path instructions may indicate that the UAV is to fly at an altitude of two-thousand (2,000) meters, for fifty (50) kilometers and fifty-five (55) minutes, and then is to fly at an altitude of one-thousand (1,000) meters, for seventy (70) kilometers and one (1) hour in order to arrive at the location of user device B.

In some implementations, the UAV platform may anticipate a particular location where user device B will be in a particular amount of time (e.g., that takes into account a time for the UAV to travel to the particular location) based on the current location, the direction of travel, and/or the speed of user device B. In some implementations, the UAV platform may take current or historical traffic conditions into account when determining the particular location.

As shown in FIG. 1B, the UAV platform may provide the flight path instructions to the UAV (e.g., via the networks). As further shown, the UAV may take off from location A, and may travel the flight path based on the flight path instructions. While the UAV is traveling along the flight path, one or more of the networks may receive feedback from user device B (e.g., about user device B changing speed, direction of travel, etc.). Assume that user device B provides, via the feedback, information about a new location of user device B (e.g., new mobile location B). The UAV platform and/or the UAV may calculate a modified flight path that enables the UAV to arrive at new mobile location B.

The UAV platform and/or the UAV may generate modified flight path instructions for the modified flight path. The UAV platform may provide the modified flight path instructions to the UAV. The UAV may travel the modified flight path, based on the modified flight path instructions. When the UAV arrives at new mobile location B, the UAV and/or user device B may generate a notification indicating that the UAV arrived safely at new mobile location B, and may provide the notification to the UAV platform. The UAV may provide the package to user B and may return to location A via a return flight path (e.g., calculated by the UAV platform).

Systems and/or methods described herein may provide a platform that enables UAVs to safely traverse flight paths from origination locations to destination locations. The systems and/or methods may enable the UAVs to travel to destination locations that are moving, such as to locations associated with users traveling in vehicles. The systems and/or methods may enable the platform to calculate flights paths that ensure that the UAVs rendezvous with users associated with mobile destination locations.

FIG. 2 is a diagram of an example environment 200 in which systems and/or methods described herein may be implemented. As illustrated, environment 200 may include user devices 210, UAVs 220, a UAV platform 230, data storage 235, a wireless network 240, a satellite network 250, and other networks 260. Devices/networks of environment 200 may interconnect via wired connections, wireless connections, or a combination of wired and wireless connections.

User device 210 may include a device that is capable of communicating over wireless network 240 with UAV 220, UAV platform 230, and/or data storage 235. In some implementations, user device 210 may include a radiotelephone; a personal communications services (PCS) terminal that may combine, for example, a cellular radiotelephone with data processing and data communications capabilities; a smart phone; a personal digital assistant (PDA) that can include a radiotelephone, a pager, Internet/intranet access, etc.; a laptop computer; a tablet computer; a global positioning system (GPS) device; a gaming device; or another type of computation and communication device.

UAV 220 may include an aircraft without a human pilot aboard, and may also be referred to as an unmanned aircraft (UA), a drone, a remotely piloted vehicle (RPV), a remotely piloted aircraft (RPA), or a remotely operated aircraft (ROA). In some implementations, UAV 220 may include a variety of shapes, sizes, configurations, characteristics, etc. for a variety of purposes and applications. In some implementations, UAV 220 may include one or more sensors, such as electromagnetic spectrum sensors (e.g., visual spectrum, infrared, or near infrared cameras, radar systems, etc.); biological sensors; chemical sensors; etc. In some implementations, UAV 220 may utilize one or more of the aforementioned sensors to sense (or detect) and avoid an obstacle in or near a flight path of UAV 220.

In some implementations, UAV 220 may include a particular degree of autonomy based on computational resources provided in UAV 220. For example, UAV 220 may include a low degree of autonomy when UAV 220 has few computational resources. In another example, UAV 220 may include a high degree of autonomy when UAV 220 has more computational resources (e.g., built-in control and/or guidance systems to perform low-level human pilot duties, such as speed and flight-path stabilization, scripted navigation functions, waypoint following, etc.). The computational resources of UAV 220 may combine information from different sensors to detect obstacles on the ground or in the air; communicate with one or more of networks 240-260 and/or other UAVs 220; determine an optimal flight path for UAV 220 based on constraints, such as obstacles or fuel requirements; determine an optimal control maneuver in order to follow a given path or go from one location to another location; regulate a trajectory of UAV 220; etc. In some implementations, UAV 220 may include a variety of components, such as a power source (e.g., an internal combustion engine, an electric battery, a solar-powered battery, etc.); a component that generates aerodynamic lift force (e.g., a rotor, a propeller, a rocket engine, a jet engine, etc.); computational resources; sensors; etc.

UAV platform 230 may include one or more personal computers, one or more workstation computers, one or more server devices, one or more virtual machines (VMs) provided in a cloud computing network, or one or more other types of computation and communication devices. In some implementations, UAV platform 230 may be associated with a service provider that manages and/or operates wireless network 240, satellite network 250, and/or other networks 260, such as, for example, a telecommunication service provider, a television service provider, an Internet service provider, etc.

In some implementations, UAV platform 230 may receive, from UAV 220, a request for a flight path from an origination location to a mobile destination location (e.g., a location of a mobile user device 210). UAV platform 230 may authenticate UAV 220 for use of UAV platform 230 and/or networks 240-260 based on the credentials, and may determine capability information for UAV 220 based on the request and/or component information associated with UAV 220. UAV platform 230 may receive a current location, a direction of travel, and/or a speed of the mobile user device 210, and may calculate the flight path from the origination location to the destination location based on the capability information, other information (e.g., weather information, air traffic information, etc.), and/or the current location, the direction of travel, and/or the speed of the mobile user device 210. UAV platform 230 may generate flight path instructions for the flight path, and may provide the flight path instructions to UAV 220. UAV platform 230 may receive feedback from UAV 220 and the mobile user device 210, via networks 240-260, during traversal of the flight path by UAV 220. UAV platform 230 may modify the flight path instructions based on the feedback, and may provide the modified flight path instructions to UAV 220. UAV platform 230 may receive a notification that UAV 220 arrived at the location of the mobile user device 210 when UAV 220 lands at the mobile destination location.

In some implementations, UAV platform 230 may determine an array of prearranged destination locations (e.g., locations to rendezvous with the mobile user device 210), and the user of the mobile user device 210 may select one of the prearranged destination locations. In some implementations, UAV 220 may arrive at a mobile location of the mobile user device 210 (e.g., within a moving emergency vehicle) and may take into account all safety considerations (e.g., safety of passengers in the emergency vehicle, safety of other vehicles, etc.).

In some implementations, UAV platform 230 may authenticate one or more users, associated with user device 210 and/or UAV 220, for utilizing UAV platform 230, and may securely store authentication information associated with the one or more users. In some implementations, UAV platform 230 may adhere to requirements to ensure that UAVs 220 safely traverse flight paths, and may limit the flight paths of UAVs 220 to particular safe zones (e.g., particular altitudes, particular geographical locations, particular geo-fencing, etc.) to further ensure safety.

Data storage 235 may include one or more storage devices that store information in one or more data structures, such as databases, tables, lists, trees, etc. In some implementations, data storage 235 may store information, such as UAV account information (e.g., serial numbers, model numbers, user names, etc. associated with UAVs 220); capability information associated with UAVs 220 (e.g., thrust, battery life, etc. associated with UAVs 220); weather information associated with a geographical region (e.g., precipitation amounts, wind conditions, etc.); air traffic information associated with the geographical region (e.g., commercial air traffic, other UAVs 220, etc.); obstacle information (e.g., buildings, mountains, towers etc.) associated with the geographical region; regulatory information (e.g., no fly zones, government buildings, etc.) associated with the geographical region; historical information (e.g., former flight paths, former weather conditions, etc.) associated with the geographical region; etc. In some implementations, data storage 235 may be included within UAV platform 230.

Wireless network 240 may include a fourth generation (4G) cellular network that includes an evolved packet system (EPS). The EPS may include a radio access network (e.g., referred to as a long term evolution (LTE) network), a wireless core network (e.g., referred to as an evolved packet core (EPC) network), an Internet protocol (IP) multimedia subsystem (IMS) network, and a packet data network (PDN). The LTE network may be referred to as an evolved universal terrestrial radio access network (E-UTRAN), and may include one or more base stations (e.g., cell towers). The EPC network may include an all-Internet protocol (IP) packet-switched core network that supports high-speed wireless and wireline broadband access technologies. The EPC network may allow user devices 210 and/or UAVs 220 to access various services by connecting to the LTE network, an evolved high rate packet data (eHRPD) radio access network (RAN), and/or a wireless local area network (WLAN) RAN. The IMS network may include an architectural framework or network (e.g., a telecommunications network) for delivering IP multimedia services. The PDN may include a communications network that is based on packet switching. In some implementations, wireless network 240 may provide location information (e.g., latitude and longitude coordinates) associated with user devices 210 and/or UAVs 220. For example, wireless network 240 may determine a location of user device 210 and/or UAV 220 based on triangulation of signals, generated by user device 210 and/or UAV 220 and received by multiple cell towers, with prior knowledge of the cell tower locations.

Satellite network 250 may include a space-based satellite navigation system (e.g., a global positioning system (GPS)) that provides location and/or time information in all weather conditions, anywhere on or near the Earth where there is an unobstructed line of sight to four or more satellites (e.g., GPS satellites). In some implementations, satellite network 250 may provide location information (e.g., GPS coordinates) associated with user devices 210 and/or UAVs 220, enable communication with user devices 210 and/or UAVs 220, etc.

Each of other networks 260 may include a network, such as a local area network (LAN), a wide area network (WAN), a metropolitan area network (MAN), a telephone network, such as the Public Switched Telephone Network (PSTN) or a cellular network, an intranet, the Internet, a fiber optic network, a cloud computing network, or a combination of networks.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

FIG. 3 is a diagram of example components of a device 300 that may correspond to one or more of the devices of environment 200. In some implementations, one or more of the devices of environment 200 may include one or more devices 300 or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4A:
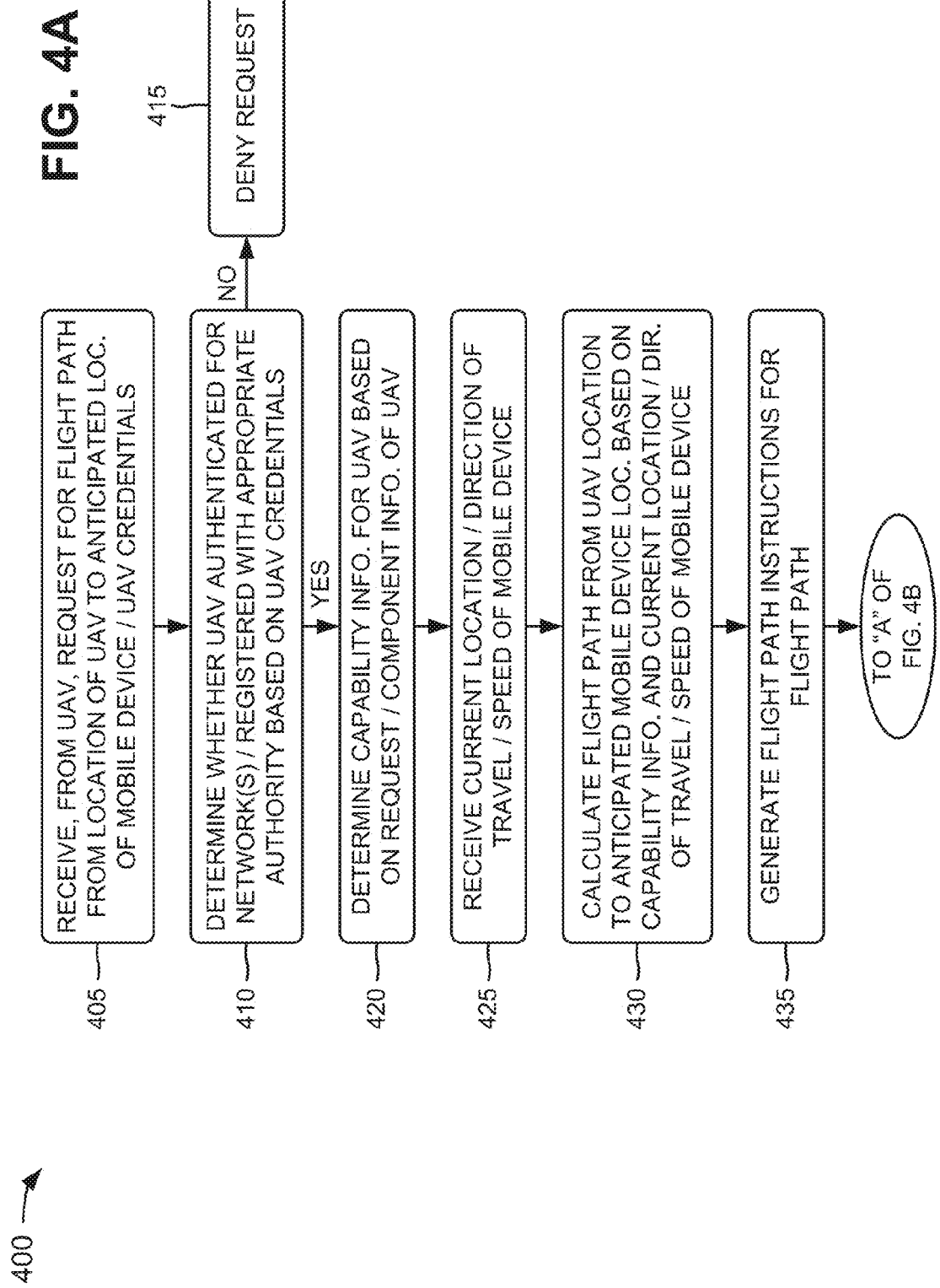

FIGS. 4A and 4B depict a flow chart of an example process 400 for determining a flight path for a UAV to a mobile destination. In some implementations, one or more process blocks of FIGS. 4A and 4B may be performed by UAV platform 230. In some implementations, one or more process blocks of FIGS. 4A and 4B may be performed by another device or a group of devices separate from or including UAV platform 230, such as user device 210 and/or UAV 220.

As shown in FIG. 4A, process 400 may include receiving, from a UAV, a request for a flight path from a location of the UAV to a location of a mobile device, and credentials of the UAV (block 405). For example, UAV platform 230 may receive, from UAV 220, a request for a flight path from a location of UAV 220 to a location of a mobile user device 210, and credentials associated with UAV 220. In some implementations, the mobile user device 210 or another user device 210 may provide information associated with the flight path to UAV 220, and UAV 220 may provide the request for the flight path to UAV platform 230. In some implementations, the request for the flight path may be provided by the mobile user device 210 or the other user device 210 to UAV platform 230. In some implementations, the request for the flight path may include a request for flight path instructions from an origination location (e.g., a current location of UAV 220) to a mobile destination location (e.g., a location of the mobile user device 210). The origination location and the mobile destination location may be provided in a particular region. In some implementations, the credentials of UAV 220 may include an identification number, a model number, a serial number, an identifier of a UICC (or another type of smart card), a government registration number, a private encryption key, a public encryption key, a certificate, etc. associated with UAV 220. In some implementations, the credentials of UAV 220 may include information identifying components of UAV 220 (e.g., serial numbers, model numbers, part numbers, etc. of the components).

As further shown in FIG. 4A, process 400 may include determining whether the UAV is authenticated for network (s) and is registered with an appropriate authority based on the UAV credentials (block 410). For example, UAV platform 230 may determine whether UAV 220 is authenticated for using UAV platform 230 and/or one or more of networks 240-260 based on the credentials of UAV 220. In some implementations, UAV platform 230 may compare the credentials of UAV 220 with UAV account information stored in data storage 235 (e.g., information associated with authenticated and registered UAVs 220, such as identification numbers of UAVs 220, public and/or private encryption keys of UAVs 220, account status information, etc.) in order to determine whether UAV 220 is authenticated for using UAV platform 230 and/or one or more of networks 240-260. For example, if the credentials of UAV 220 include a serial number of UAV 220, UAV platform 230 may compare the serial number to the UAV account information in data storage 235 to determine whether UAV 220 is registered with UAV platform 230, whether an account of UAV 220 is in good standing (e.g., paid for), etc. In some implementations, UAV platform 230 may determine whether UAV 220 is authenticated for using UAV platform 230 and/or one or more of networks 240-260 based on a UICC associated with UAV 220.

In some implementations, UAV platform 230 may determine whether UAV 220 is registered with an appropriate authority (e.g., a government agency) based on the credentials of UAV 220. For example, if the credentials of UAV 220 include a government registration number of UAV 220, UAV platform 230 may compare the government registration number to the UAV account information in data storage 235 to determine whether UAV 220 is registered with a government agency to legally fly in airspace regulated by the government agency. In some implementations, UAV 220 may include a common protocol with other UAVs 220. The common protocol may enable UAV 220 to be authenticated for using UAV platform 230 and/or one or more of networks 240-260, to communicate with the other UAVs 220, and/or to be verified as being registered with an appropriate authority. For example, if a particular UAV 220 is flying in an area where the particular UAV 220 loses communication with wireless network 240, UAV 220 may establish communications with other UAVs 220 located near the particular UAV 220 (e.g., via the common protocol). The other UAVs 220 may share information (e.g., received from wireless network 240) with the particular UAV 220 via the communications.

As further shown in FIG. 4A, if the UAV is not authenticated for the network(s) and/or is not registered with an appropriate authority (block 410—NO), process 400 may include denying the request for the flight path (block 415). For example, if UAV platform 230 determines that UAV 220 is not authenticated for using UAV platform 230 and/or one or more of networks 240-260 based on the credentials of UAV 220, UAV platform 230 may deny the request for the flight path. In some implementations, UAV platform 230 may provide, to UAV 220, a notification indicating that the request for the flight path is denied due to UAV 220 not being authenticated for using UAV platform 230 and/or one or more of networks 240-260. In some implementations, UAV platform 230 may determine that UAV 220 is not authenticated for using UAV platform 230 and/or one or more of networks 240-260 when UAV 220 is not registered with UAV platform 230, an account of UAV 220 is not in good standing, etc.

Additionally, or alternatively, if UAV platform 230 determines that UAV 220 is not registered with an appropriate authority based on the credentials of UAV 220, UAV platform 230 may deny the request for the flight path. In some implementations, UAV platform 230 may provide, to UAV 220, a notification indicating that the request for the flight path is denied due to UAV 220 not being registered with an appropriate authority. In some implementations, UAV platform 230 may determine that UAV 220 is not registered with an appropriate authority when UAV 220 fails to provide a government registration number via the credentials of UAV 220.

As further shown in FIG. 4A, if the UAV is authenticated for the network(s) and is registered with an appropriate authority (block 410—YES), process 400 may include determining capability information for the UAV based on the request and component information of the UAV (block 420). For example, if UAV platform 230 determines, based on the credentials of UAV 220, that UAV 220 is authenticated for using UAV platform 230 and/or one or more of networks 240-260, and is registered with an appropriate authority, UAV platform 230 may approve the request for the flight path. In some implementations, UAV platform 230 may determine that UAV 220 is authenticated for using UAV platform 230 and/or one or more of networks 240-260 when UAV 220 is registered with UAV platform 230, an account of UAV 220 is in good standing (e.g., paid for), etc. In some implementations, UAV platform 230 may determine that UAV 220 is registered with an appropriate authority when UAV 220 provides a government registration number that matches a government registration number provided in data storage 235.

In some implementations, if UAV platform 230 approves the request for the flight path, UAV platform 230 may determine capability information for UAV 220 based on the request for the flight path and component information of UAV 220 (e.g., provided with the request for the flight path). For example, data storage 235 may include capability information associated with different components of UAVs 220, such as battery life, thrusts provided by rotors, flight times associated with amounts of fuel, etc. In some implementations, UAV platform 230 may utilize the component information of UAV 220 (e.g., UAV 220 has a particular type of battery, engine, rotors, etc.) to retrieve the capability information for components of UAV 220 from data storage 235. For example, if UAV 220 has a particular type of battery and a particular type of rotor, UAV platform 230 may determine that the particular type of battery of UAV 220 may provide two hours of flight time and that the particular type of rotor may enable UAV 220 to reach an altitude of one-thousand meters.

In some implementations, UAVs 220 may be required to follow a maintenance schedule (e.g., for safety purposes), and may need to be certified (e.g., by a government agency) that the maintenance schedule is followed. Such information may be provided in data storage 235 (e.g., with the capability information). In some implementations, if UAV platform 230 determines that UAV 220 is authenticated for using UAV platform 230 and/or one or more of networks 240-260, and is registered with an appropriate authority, UAV platform 230 may still deny the request for the flight path if UAV platform 230 determines that UAV 220 has not properly followed the maintenance schedule. This may enable UAV platform 230 to ensure that only properly maintained UAVs 220 are permitted to fly, which may increase safety associated with UAVs 220 utilizing airspace.

As further shown in FIG. 4A, process 400 may include receiving a current location, a direction of travel, and a speed of the mobile device (block 425). For example, UAV platform 230 may receive, from the mobile user device 210, a current location, a direction of travel, and/or a speed associated with the mobile user device 210. In some implementations, the current location of the mobile user device 210 may include a current location of the mobile user device 210, as provided by wireless network 240 (e.g., via cell tower triangulation). Additionally, or alternatively, the current location of mobile user device 210 may include a current GPS location of the mobile user device 210, as provided by satellite network 250 (e.g., via GPS satellites). In some implementations, the direction of travel of the mobile user device 210 may be generated by a component (e.g., a compass or magnetometer) of the mobile user device 210, and provided to UAV platform 230. Additionally, or alternatively, the direction of travel of mobile user device 210 may be determined by UAV platform 230 based on prior locations and the current location of the mobile user device 210. In some implementations, the speed of the mobile user device 210 may be generated by a component (e.g., an accelerometer) of the mobile user device 210, and provided to UAV platform 230. Additionally, or alternatively, the speed of the mobile user device 210 may be determined by UAV platform 230 based on the prior locations and the current location of the mobile user device 210. In some implementations, UAV platform 230 may receive the current location, the direction of travel, and/or the speed of the mobile user device 210 from one or more of networks 240-260.

For example, assume that the mobile user device 210 is provided in a vehicle that is traveling at sixty kilometers per hour in a northeast direction and is currently located at a latitude of 39° north and a longitude of 75° west. In such an example, UAV platform 230 may receive the latitude of 39° north and the longitude of 75° west as the current location of the mobile user device 210; northeast as the direction of travel of the mobile user device 210; and sixty kilometers per hour as the speed of the mobile user device 210.

As further shown in FIG. 4A, process 400 may include calculating the flight path from the location of the UAV to the anticipated location of the mobile device based on the capability information, other information, and/or the current location, direction of travel, and speed of the mobile device (block 430). For example, UAV platform 230 may calculate the flight path from the origination location to an anticipated location of the mobile user device 210, based on the capability information and/or other information (e.g., the weather information, the air traffic information, the obstacle information, the regulatory information, and/or the historical information) stored in UAV platform 230 and/or data storage 235, and based on the current location, the direction of travel, and/or the speed associated with the mobile user device 210. In some implementations, UAV platform 230 may determine whether the capability information indicates that UAV 220 may safely complete the flight path from the origination location to the location of the mobile user device 210 without stopping. If UAV platform 230 determines that UAV 220 cannot safely complete the flight path from the origination location to the anticipated location of the mobile user device 210 without stopping (e.g., to recharge or refuel), UAV platform 230 may determine one or more waypoints along the flight path where UAV 220 may stop and recharge or refuel.

In some implementations, UAV platform 230 may calculate the flight path based on the capability information associated with UAV 220 and the weather information. For example, UAV platform 230 may determine that, without weather issues, the flight path may take UAV 220 two hours to complete at an altitude of five-hundred meters. UAV platform 230 may further determine that wind conditions at five-hundred meters may create a headwind of fifty kilometers per hour on UAV 220, but that wind conditions at one-thousand meters may create a tailwind of fifty kilometers per hour on UAV 220. In such an example, UAV platform 230 may alter the flight path from an altitude of five-hundred meters to an altitude of one-thousand meters (e.g., if UAV 220 is capable of reaching the altitude of one-thousand meters). Assume that the tailwind at the altitude of one-thousand meters decreases the flight time from two hours to one hour and thirty minutes. Alternatively, UAV platform 230 may not alter the flight path, but the headwind at the altitude of five-hundred meters may increase the flight time from two hours to two hours and thirty minutes.

Additionally, or alternatively, UAV platform 230 may calculate the flight path based on the capability information associated with UAV 220 and the air traffic information. For example, UAV platform 230 may determine that, without air traffic issues, the flight path may take UAV 220 two hours to complete at an altitude of five-hundred meters. UAV platform 230 may further determine that other UAVs 220 are flying at the altitude of five-hundred meters based on the air traffic information, but that no other UAVs 220 are flying at an altitude of one-thousand meters. In such an example, UAV platform 230 may alter the flight path from an altitude of five-hundred meters to an altitude of one-thousand meters. The altitude of one-thousand meters may enable UAV 220 to safely arrive at the location without the possibility of colliding with other UAVs 220. Alternatively, UAV platform 230 may not alter the flight path, but the other UAVs 220 flying at the altitude of five-hundred meters may increase possibility that UAV 220 may collide with another UAV 220. UAV platform 230 may then determine whether UAV 220 is capable of safely flying at the altitude of five-hundred meters without colliding with another UAV 220.

Additionally, or alternatively, UAV platform 230 may calculate the flight path based on the capability information associated with UAV 220 and the obstacle information. For example, UAV platform 230 may determine that, without obstacle issues, the flight path may take UAV 220 one hour to complete at an altitude of two-hundred meters. UAV platform 230 may further determine that one or more buildings are two-hundred meters in height based on the obstacle information, but that no other obstacles are greater than two-hundred meters in height. In such an example, UAV platform 230 may alter the flight path from an altitude of two-hundred meters to an altitude of three-hundred meters. The altitude of three-hundred meters may enable UAV 220 to safely arrive at the location without the possibility of colliding with the one or more buildings. Alternatively, UAV platform 230 may not alter the altitude of the flight path, but may change the flight path to avoid the one or more buildings, which may increase the flight time from one hour to one hour and thirty minutes.

Additionally, or alternatively, UAV platform 230 may calculate the flight path based on the capability information associated with UAV 220 and the regulatory information. For example, UAV platform 230 may determine that, without regulatory issues, the flight path may take UAV 220 one hour to complete at an altitude of five-hundred meters. UAV platform 230 may further determine that the flight path travels over a restricted facility based on the regulatory information. In such an example, UAV platform 230 may change the flight path to avoid flying over the restricted facility, which may increase the flight time from one hour to one hour and thirty minutes.

Additionally, or alternatively, UAV platform 230 may calculate the flight path based on the capability information associated with UAV 220 and the historical information. For example, UAV platform 230 may identify prior flight paths to the location from the historical information, and may select one of the prior flight paths, as the flight path, based on the capability information associated with UAV 220. For example, assume that UAV platform 230 identifies three prior flight paths that include flight times of two hours, three hours, and four hours, respectively, and may determine that UAV 220 may safely fly for two hours and thirty minutes (e.g., based on the capability information). In such an example, UAV platform 230 may select, as the flight path, the prior flight path with the flight time of two hours.

In some implementations, UAV platform 230 may calculate the flight path from the origination location to the anticipated location of the mobile user device 210 based on the current location, the direction of travel, and/or the speed of the mobile user device 210. In some implementations, UAV platform 230 may determine a waypoint (e.g., an anticipated location of the mobile user device 210) for the flight path based on the current location, the direction of travel, and/or the speed of the mobile user device 210. The waypoint may include a location (e.g., a meeting location) where UAV 220 may rendezvous with the mobile user device 210 and deliver a payload to a user of the mobile user device 210. For example, UAV platform 230 may determine that the mobile user device 210 will be at a particular location at a particular time based on the current location, the direction of travel, and/or the speed of the mobile user device 210. In such an example, UAV platform 230 may calculate a flight path that causes UAV 220 to arrive at the particular location before or around the particular time that the mobile user device 210 arrives at the particular location. UAV platform 230 may provide, to the mobile user device 210, a notification indicating that UAV 220 will be at the particular location at the particular time (e.g., so that the user of the mobile user device 210 may stop at the particular location). In some implementations, UAV platform 230 may provide, to the mobile user device 210, information indicating a proximity of UAV 220 to the mobile user device 210 so that the user may track the location of UAV 220.

In some implementations, UAV platform 230 may determine, for the flight path and based on the current location, the direction of travel, and/or the speed of the mobile user device 210, that UAV 220 is to descend toward the mobile user device 210 when UAV 220 is a particular distance away from the mobile user device 210. For example, assume that the mobile user device 210 is provided in a vehicle traveling north on an interstate highway, and that UAV platform 230 determines that UAV 220 may fly to a rest stop (e.g., and remain airborne) on the interstate highway ahead of the mobile user device 210. In such an example, when the mobile user device 210 is within a particular distance of the rest stop, UAV 220 may descend toward a location at the rest stop so that the user of the mobile user device 210 may receive a payload provided by UAV 220. UAV platform 230 may also provide, to the mobile user device 210, information indicating a proximity of UAV 220 to the mobile user device 210 so that the user may track the location of UAV 220 at the rest stop.

In some implementations, UAV platform 230 may calculate, based on the current location, the direction of travel, and/or the speed of the mobile user device 210, a flight path that includes a destination location where the mobile user device 210 may retrieve a payload provided by UAV 220. For example, UAV platform 230 may calculate a destination location (e.g., along an anticipated travel path of the mobile user device 210) that is associated with a partner entity, such as, for example, a convenience store, a big chain store, a fast food restaurant, a rest stop, a retail store, a parking lot, a restaurant, a grocery store, etc. An employee for the partner entity may receive a payload provided by UAV 220, and may hold the payload until the user of the mobile user device 210 claims the payload. In such an example, UAV platform 230 may provide, to the mobile user device 210, information indicating a location of the partner entity and a confirmation code (e.g., a bar code, a quick response (QR) code, a word, a numeric code, an alphabetical code, an alphanumeric code, etc.) or an authentication mechanism (e.g., a private and/or public encryption key, a certificate, a password, etc.). The user of the mobile user device 210 may utilize the confirmation code or the authentication mechanism to authenticate the user (e.g., to the partner entity) so that the user may receive the payload from the partner entity. In some implementations, the partner entity may be rewarded in some manner for accepting payloads on behalf of the user and/or on behalf of owners or operators of UAVs 220.

In some implementations, UAV platform 230 may determine, for the flight path and based on the current location, the direction of travel, and/or the speed of the mobile user device 210, that UAV 220 is to search for a particular wireless local area network (WLAN) (e.g., an IEEE 802.15 (e.g., Bluetooth) network, an IEEE 802.11 (e.g., Wi-Fi) network, a near field communication (NFC) network, etc.) generated by the mobile user device 210. In such implementations, UAV 220 may descend toward the mobile user device 210 when UAV 220 detects the particular WLAN. For example, the mobile user device 210 may generate a Wi-Fi signal and UAV 220 may traverse the flight path until UAV 220 detects the Wi-Fi signal. When UAV 220 detects the Wi-Fi signal, UAV 220 may descend toward the mobile user device 210 and deliver the payload to the user of the mobile user device 210. In another example, if the user of mobile user device 210 is going hiking or mountain climbing in a desolate area, the user may instruct UAV platform 230 to send UAVs 220 to search for the user if a signal is not received from the mobile user device 210 for a particular amount of time (e.g., in hours, days, etc.). In such an example, after the particular amount of time, the mobile user device 210 may generate a Wi-Fi signal, and UAV platform 230 may dispatch UAVs 220 to search for the user based on the Wi-Fi signal. Such an arrangement may aid in search and rescue missions, especially in areas that are difficult to traverse by foot or by vehicle.

In some implementations, UAV platform 230 may calculate the flight path from the origination location to the mobile destination location based on the capability information, the weather information, the air traffic information, the obstacle information, the regulatory information, the historical information, the current location of the mobile user device 210, the direction of travel of the mobile user device 210, and/or the speed of the mobile user device 210.

As further shown in FIG. 4A, process 400 may include generating flight path instructions for the flight path (block 435). For example, UAV platform 230 may generate flight path instructions for the flight path. In some implementations, the flight path instructions may include specific altitudes for UAV 220 between fixed geographic coordinates (e.g., a first location and a second location); navigational information (e.g., travel east for three kilometers, then north for two kilometers, etc.); expected weather conditions (e.g., headwinds, tailwinds, temperatures, etc.); network information (e.g., locations of base stations of wireless network 240); timing information (e.g., when to take off, when to perform certain navigational maneuvers, etc.); waypoint information (e.g., locations where UAV 220 may stop and recharge or refuel); etc. For example, the flight path instructions may include information that instructs UAV 220 to fly forty-five degrees northeast for ten kilometers at an altitude of five-hundred meters, fly three-hundred and fifteen degrees northwest for ten kilometers at an altitude of four-hundred meters, etc.

As shown in FIG. 4B, process 400 may include providing the flight path instructions to the UAV (block 440). For example, UAV platform 230 may provide the flight path instructions to UAV 220. In some implementations, UAV 220 may utilize the flight path instructions to travel via the flight path. For example, UAV 220 may take off at a time specified by the flight path instructions, may travel a route and at altitudes specified by the flight path instructions, may detect and avoid any obstacles encountered in the flight path, etc. until UAV 220 arrives at the location of the mobile user device 210.

In some implementations, if UAV 220 includes sufficient computational resources (e.g., a sufficient degree of autonomy), UAV 220 may utilize information provided by the flight path instructions to calculate a flight path for UAV 220 and to generate flight path instructions. In such implementations, the flight path instructions provided by UAV platform 230 may include less detailed information, and UAV 220 may determine more detailed flight path instructions via the computational resources of UAV 220.

As further shown in FIG. 4B, process 400 may include receiving feedback from the UAV and/or the mobile device, via network(s), during traversal of the flight path by the UAV (block 445). For example, while UAV 220 is traveling along the flight path in accordance with the flight path instructions, UAV 220 and/or the mobile user device 210 may provide feedback to UAV platform 230 via one or more of networks 240-260, and UAV platform 230 may receive the feedback. In some implementations, the feedback may include information received by sensors of UAV 220, such as visual information received from electromagnetic spectrum sensors of UAV 220 (e.g., images of obstacles), temperature information, wind conditions, etc. In some implementations, UAV 220 may utilize such feedback to detect and avoid any unexpected obstacles encountered by UAV 220 during traversal of the flight path. For example, if UAV 220 detects another UAV 220 in the flight path, UAV 220 may alter the flight path to avoid colliding with the other UAV 220.

In some implementations, the feedback may include updates to the current location, the direction of travel, and/or the speed of the mobile user device 210. For example, if the mobile user device 210 is provided in a moving vehicle, the current location of the mobile user device 210 may constantly be updated and provided to UAV platform 230 via the feedback. In another example, if the moving vehicle changes directions from north to east, the direction of travel of the mobile user device 210 may be updated (e.g., from north to east) and provided to UAV platform 230 via the feedback. In still another example, if the moving vehicle slows down from fifty kilometers per hour to ten kilometers per hour, the speed of the mobile user device 210 may be updated (e.g., from fifty to ten kilometers per hour) and provided to UAV platform 230 via the feedback.

As further shown in FIG. 4B, process 400 may include determining whether to modify the flight path based on the feedback from the UAV and/or the mobile device (block 450). For example, UAV platform 230 may determine whether to modify the flight path based on the feedback. In some implementations, UAV platform 230 may determine to not modify the flight path if the feedback indicates that UAV 220 will safely arrive at the location of the mobile user device 210. In some implementations, UAV platform 230 may determine to modify the flight path if the feedback indicates that UAV 220 is in danger of colliding with an obstacle (e.g., another UAV 220, a building, an airplane, etc.). In such implementations, UAV platform 230 may modify the flight path so that UAV 220 avoids colliding with the obstacle and/or remains a safe distance from the obstacle.

In some implementations, UAV platform 230 may determine to modify the flight path if the feedback indicates that the weather conditions may prevent UAV 220 from reaching the location of the mobile user device 210. For example, the wind conditions may change and cause the flight time of UAV 220 to increase to a point where the battery of UAV 220 will be depleted before UAV 220 reaches the location of the mobile user device 210. In such an example, UAV platform 230 may modify the flight path so that UAV 220 either stops to recharge or changes altitude to improve wind conditions. In another example, rain or ice may increase the weight of UAV 220 and/or its payload and may cause the battery of UAV 220 to work harder to a point where the battery of UAV 220 will be depleted before UAV 220 reaches the location of the mobile user device 210. In such an example, UAV platform 230 may modify the flight path so that UAV 220 stops to recharge before completing the flight path.

In some implementations, UAV platform 230 may determine to modify the flight path if the feedback indicates that the direction of travel and/or the speed of the mobile user device 210 has changed. For example, if the mobile user device 210 is provided in a moving vehicle that changes directions from north to east, the original flight path may cause UAV 220 to not rendezvous with the mobile user device 210. In such an example, UAV platform 230 may modify the flight path so that UAV 220 travels in a direction (e.g., east instead of north) that enables UAV 220 to rendezvous with the mobile user device 210. In another example, if the moving vehicle slows down from fifty kilometers per hour to ten kilometers per hour, the original flight path may cause UAV 220 to fly too far ahead of the mobile user device 210. In such an example, UAV platform 230 may modify the flight path so that UAV 220 slows down to ensure that UAV 220 does not fly too far ahead of the mobile user device 210 (e.g., and rendezvous with the mobile user device 210).

As further shown in FIG. 4B, if the flight path is to be modified (block 450—YES), process 400 may include generating modified flight path instructions based on the feedback (block 455). For example, if UAV platform 230 determines that the flight path is be modified, UAV platform 230 may modify the flight path based on the feedback (e.g., as described above). In some implementations, UAV platform 230 may generate modified flight path instructions for the modified flight path based on the feedback. In some implementations, the modified flight path instructions may modify the flight path instructions based on the feedback. For example, the flight path instructions may be modified so that UAV 220 avoids colliding with an obstacle and/or remains a safe distance from the obstacle, stops to recharge, changes altitude to improve wind conditions, etc. In another example, the flight path instructions may be modified so that UAV 220 changes direction (e.g., to match a directional change of the mobile user device 210) and rendezvous with the mobile user device 210.

As further shown in FIG. 4B, process 400 may include providing the modified flight path instructions to the UAV (block 460). For example, UAV platform 230 may provide the modified flight path instructions to UAV 220. In some implementations, UAV 220 may utilize the modified flight path instructions to travel along the modified flight path. For example, UAV 220 may stop and recharge according to the modified flight instructions, may adjust a route and/or altitudes according to the modified flight path instructions, may detect and avoid any obstacles encountered in the modified flight path, etc. until UAV 220 arrives at the location of the mobile user device 210. In some implementations, UAV 220 may continue to provide further feedback to UAV platform 230 during traversal of the modified flight path, and UAV platform 230 may or may not further modify the flight path based on the further feedback.

As further shown in FIG. 4B, process 400 may include receiving a notification that the UAV arrived at the location of the mobile device (block 465). For example, UAV 220 may continue along the flight path (or the modified flight path) based on the flight path instructions (or the modified flight path instructions) until UAV 220 arrives at the location the mobile user device 210. When UAV 220 arrives at the location of the mobile user device 210, UAV 220 may provide a notification to UAV platform 230, via one or more of networks 240-260. In some implementations, the notification may indicate that UAV 220 has safely arrived at the location of the mobile user device 210. Additionally, or alternatively, the mobile user device 210 may generate the notification, and may provide the notification to UAV platform 230.

Although FIGS. 4A and 4B shows example blocks of process 400, in some implementations, process 400 may include additional blocks, fewer blocks, different blocks, or differently arranged blocks than those depicted in FIGS. 4A and 4B. Additionally, or alternatively, two or more of the blocks of process 400 may be performed in parallel.

Figure 5B:
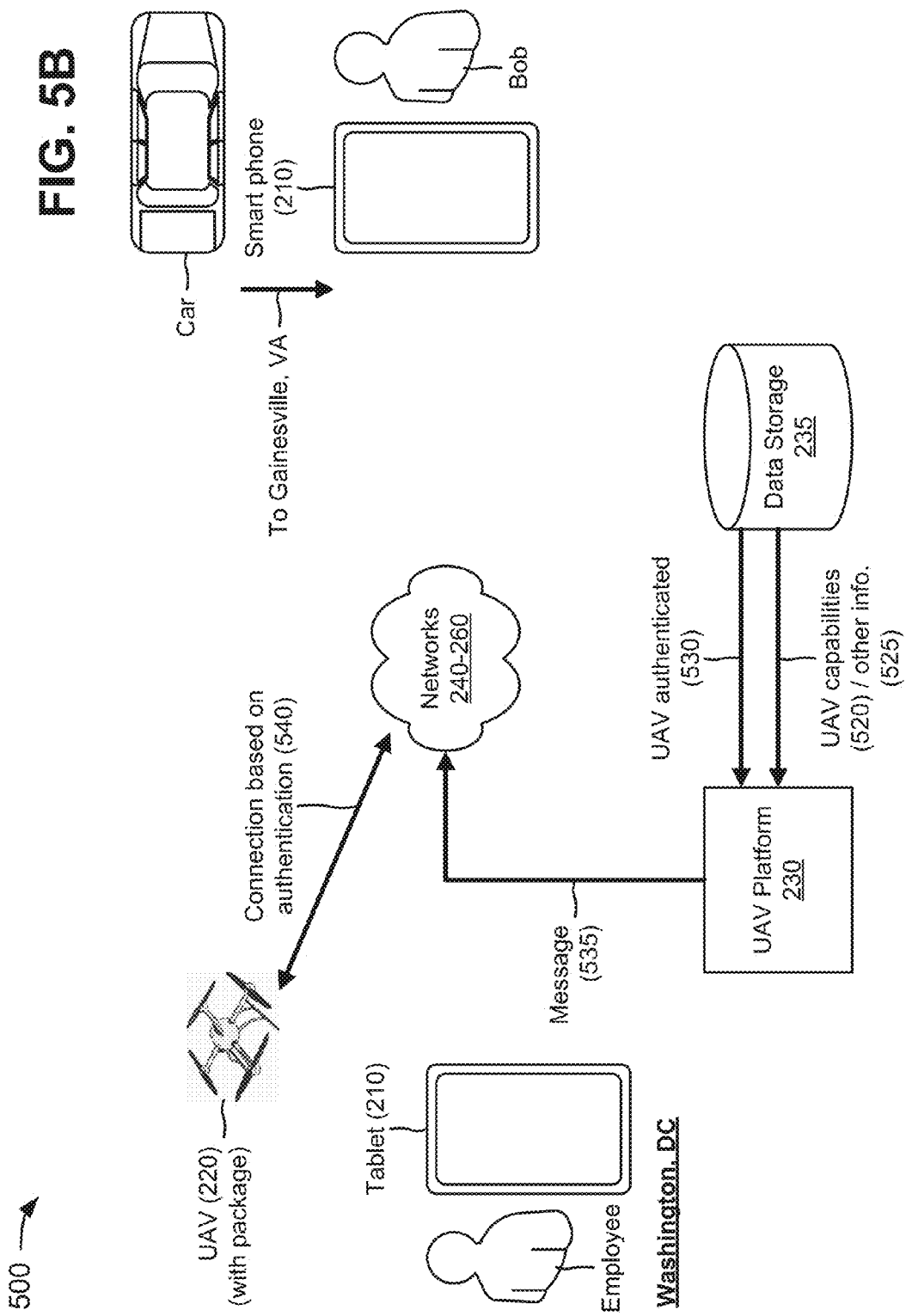

FIGS. 5A-5E are diagrams of an example 500 relating to example process 400 shown in FIGS. 4A and 4B. Assume that a first user device 210 (e.g., a tablet 210) is associated with a first user (e.g., an employee at a delivery company) that is located at an origination location (e.g., Washington, D.C.), as shown in FIG. 5A. Further, assume that a second user device 210 (e.g., a smart phone 210) is associated with a second user (e.g., Bob) that is currently located at a location (e.g., Fairfax, Va.), but is traveling in a car in a particular direction (e.g., towards Gainesville, Va.). Previously, assume that Bob instructed smart phone 210 to request delivery of a package to Bob based on a current location of smart phone 210 (e.g., a mobile destination location). For example, smart phone 210 may inform tablet 210 (e.g., via one or more servers associated with the delivery company) and the employee that the package is to be delivered to Bob at an anticipated location of smart phone 210. Further, assume that the employee wants to utilize UAV 220 to fly the package from Washington, D.C. to the anticipated location of smart phone 210 in order to deliver the package to Bob.

As further shown in FIG. 5A, UAV platform 230 and data storage 235 may communicate with wireless network 240, satellite network 250, and/or other networks 260. Wireless network 240, satellite network 250, and/or other networks 260 may provide, to data storage 235, information 505, such as capability information associated with UAV 220, weather information associated with a geographical region (e.g., that includes a geographical location of Washington, D.C., a geographical location of Fairfax, Va., and geographical locations between and around Washington and Fairfax), air traffic information associated with the geographical region, obstacle information associated with the geographical region, regulatory information associated with the geographical region, historical information associated with the geographical region, etc.

As further shown in FIG. 5A, the employee may instruct tablet 210 (or UAV 220) to generate a request 510 for a flight path (e.g., from Washington, D.C. to the location of smart phone 210) for UAV 220, and to provide request 510 to UAV platform 230. Request 510 may include credentials 515 (e.g., a serial number, an identifier of a UICC, etc. of UAV 220) associated with UAV 220, or credentials 515 may be provided separately from request 510 to UAV platform 230. UAV platform 230 may utilize credentials 515 to determine whether UAV 220 is authenticated for utilizing UAV platform 230 and/or one or more of networks 240-260, and is registered with an appropriate authority for use. For example, UAV platform 230 may compare credentials 515 with information provided in data storage 235 in order to determine whether UAV 220 is authenticated for utilizing UAV platform 230 and/or one or more of networks 240-260, and is registered with an appropriate authority.

As shown in FIG. 5B, UAV platform 230 may retrieve capability information 520 associated with UAV 220 and other information 525 (e.g., weather information, air traffic information, obstacle information, regulatory information, and/or historical information) from data storage 235 based on component information of UAV 220 (e.g., provided with request 510). As further shown, assume that UAV platform 230 determines that UAV 220 is authenticated for utilizing UAV platform 230 and/or one or more of networks 240-260, and is registered with an appropriate authority, as indicated by reference number 530. Further, assume that UAV platform 230 provides, to networks 240-260, a message 535 indicating that UAV 220 is authenticated to use one or more of networks 240-260. UAV 220 may connect with one or more of networks 240-260 based on the authentication of UAV 220, as indicated by reference number 540.

As shown in FIG. 5C, UAV platform 230 may receive, from smart phone 210 and via one or more of networks 240-260, a current location, a direction of travel, and a speed associated with smart phone 210, as indicated by reference number 545. UAV platform 230 may calculate a flight path 550 from Washington, D.C. to the anticipated location of smart phone 210 based on capability information 520, other information 525, and/or the current location, the direction of travel, and/or the speed associated with smart phone 210. As further shown in FIG. 5C, UAV platform 230 may generate flight path instructions 555 for flight path 550, and may provide flight path instructions 555 to UAV 220, via one or more of networks 240-260. Flight path instructions 555 may include information instructing UAV 220 to fly north at zero degrees for ten kilometers, fly northeast at forty degrees for three kilometers, at an altitude of one-thousand meters, etc. UAV 220 may take off from Washington, D.C., and may travel flight path 550 based on flight path instructions 555.

Figure 5D:
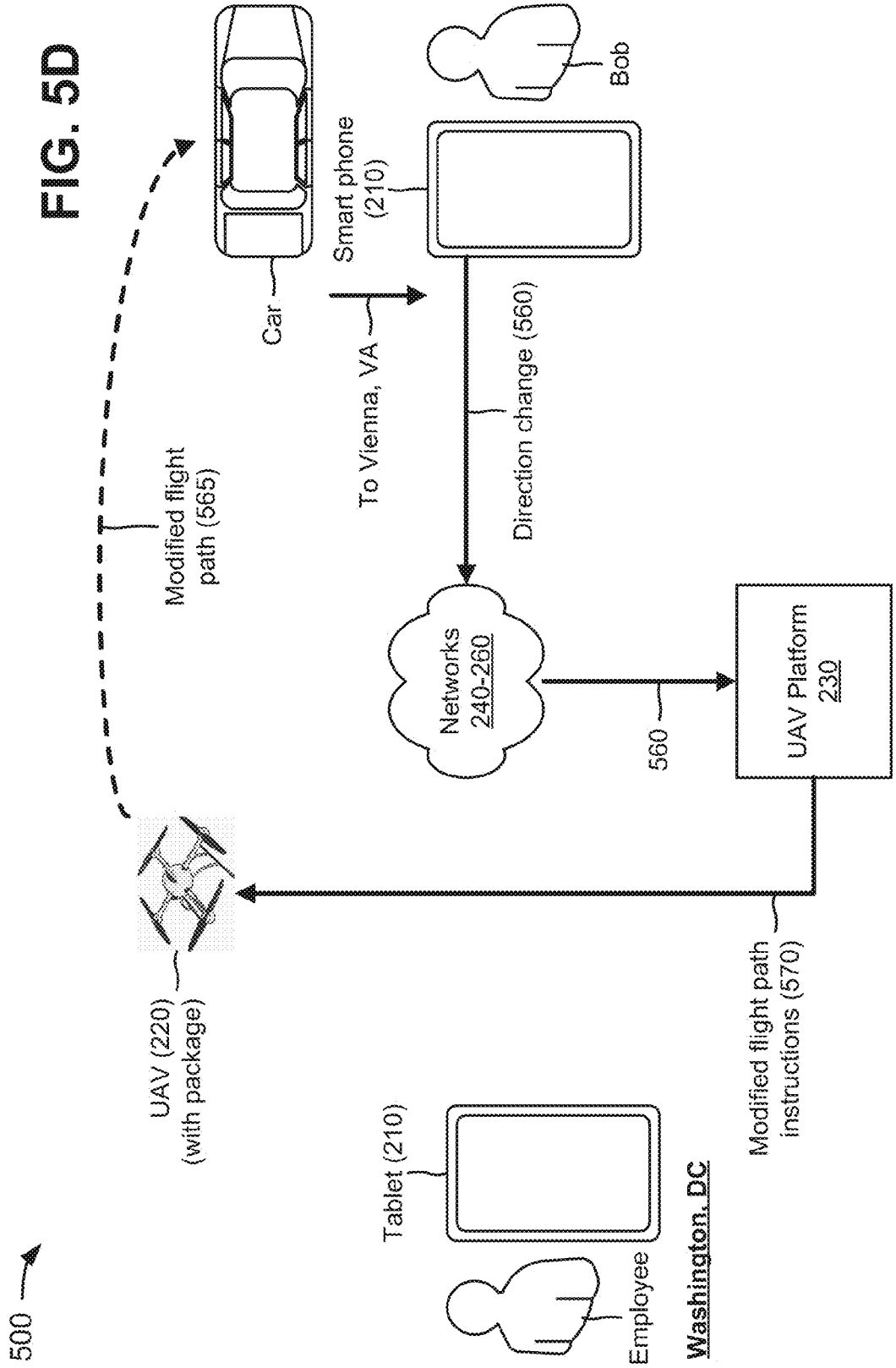

While UAV 220 is traveling along flight path 550, assume that the car, in which Bob and smart phone 210 are traveling, changes direction and begins heading toward another direction (e.g., towards Vienna, Va.), as shown in FIG. 5D. Smart phone 210 may provide information 560 associated with the direction change to UAV platform 230, via one or more of networks 240-260. UAV platform 230 and/or UAV 220 may calculate a modified flight path 565 based on information 560. Modified flight path 565 may enable UAV 220 to accommodate for the direction change of smart phone 210. As further shown in FIG. 5D, UAV platform 230 and/or UAV 220 may generate modified flight path instructions 570 for modified flight path 565. UAV platform 230 may provide modified flight path instructions 570 to UAV 220 (e.g., via one or more of networks 240-260). UAV 220 may travel modified flight path 565 based on modified flight path instructions 570.

Figure 5E:
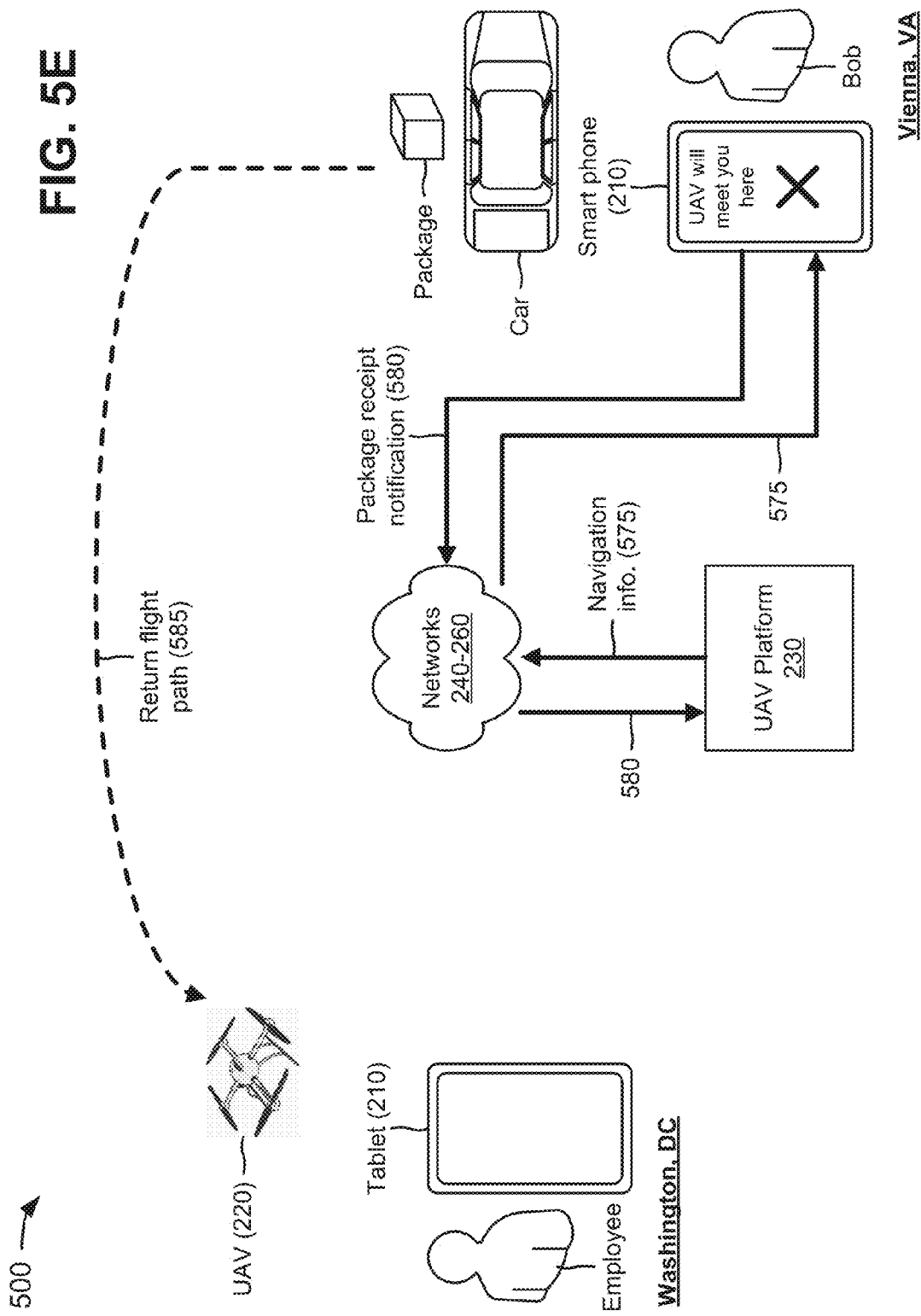

As shown in FIG. 5E, UAV platform 230 may provide navigation information 575 to smart phone 210, via one or more of networks 240-260, and smart phone 210 may display navigation information 575 to Bob. Navigation information 575 may provide, to Bob, a location where UAV 220 will meet Bob so that Bob may receive the package (e.g., at a rest stop along a highway in Vienna, Va.). UAV 220 may travel to the location specified by navigation instructions 575 (e.g., the rest stop in Vienna, Va.), and may meet Bob. When UAV 220 arrives at the location specified by navigation instructions 575, UAV 220 may leave the package at a location where Bob may retrieve the package. UAV 220 and/or smart phone 210 (e.g., via Bob's input or detection of the presence of UAV 220) may generate a notification 580 indicating that the package was received by Bob, and may provide notification 580 to UAV platform 230. After delivering the package to Bob, UAV 220 may traverse a return flight path 585 (e.g., provided by UAV platform 230 to UAV 220) until UAV 220 arrives back at the origination location in Washington, D.C.

As indicated above, FIGS. 5A-5E are provided merely as an example. Other examples are possible and may differ from what was described with regard to FIGS. 5A-5E.

Systems and/or methods described herein may provide a platform that enables UAVs to safely traverse flight paths from origination locations to destination locations. The systems and/or methods may enable the UAVs to travel to destination locations that are moving, such as to locations associated with users traveling in vehicles. The systems and/or methods may enable the platform to calculate flights paths that ensure that the UAVs rendezvous with users associated with mobile destination locations.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

User interfaces may include graphical user interfaces (GUIs) and/or non-graphical user interfaces, such as text-based interfaces. The user interfaces may provide information to users via customized interfaces (e.g., proprietary interfaces) and/or other types of interfaces (e.g., browser-based interfaces, etc.). The user interfaces may receive user inputs via one or more input devices, may be user-configurable (e.g., a user may change the sizes of the user interfaces, information displayed in the user interfaces, color schemes used by the user interfaces, positions of text, images, icons, windows, etc., in the user interfaces, etc.), and/or may not be user-configurable. Information associated with the user interfaces may be selected and/or manipulated by a user (e.g., via a touch screen display, a mouse, a keyboard, a keypad, voice commands, etc.).

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, a request for a flight path for an unmanned aerial vehicle to travel from a geographical location to a first anticipated geographical location associated with a mobile device;
   determining, by the device, capability information for the unmanned aerial vehicle based on component information associated with the unmanned aerial vehicle;
   receiving, by the device, information associated with a first location, a first direction of travel, and a first speed of the mobile device,
      the first location being a current location of the mobile device;
   calculating, by the device, the flight path from the geographical location to the first anticipated geographical location based on the capability information and based on the information associated with the first location, the first direction of travel, and the first speed of the mobile device;
   generating, by the device, flight path instructions for the flight path;
   providing, by the device, the flight path instructions to the unmanned aerial vehicle,
      the unmanned aerial vehicle travelling from the geographical location to the first anticipated geographical location, based on the flight path instructions;
   receiving, by the device, first feedback information from the unmanned aerial vehicle,
      the first feedback information including a weather condition;
   receiving, by the device, second feedback information from the mobile device,
      the second feedback information including information associated with:
         a second location of the mobile device,
            the second location being an updated location with respect to the first location,
         a second direction of travel of the mobile device,
            the second direction of travel being an updated direction of travel with respect to the first direction of travel, and
         a second speed of the mobile device,
            the second speed of the mobile device being an updated speed of the mobile device with respect to the first speed of the mobile device;
   determining, by the device and based on the first feedback information and the second feedback information, whether the unmanned aerial vehicle is able to travel to the first anticipated geographical location;
   modifying, by the device, the flight path instructions for a modified flight path based on determining that the unmanned aerial vehicle is unable to travel to the first anticipated geographical location; and
   providing, by the device, modified flight path instructions to the unmanned aerial vehicle,
      the unmanned aerial vehicle travelling towards a second anticipated geographical location, associated with the mobile device, based on the modified flight path instructions.

2. The method of claim 1, where the modified flight path includes information identifying the second anticipated geographical location;
   where the method further comprises:
      calculating, based on determining that the unmanned aerial vehicle is unable to travel to the first anticipated geographical location, the modified flight path; and
   where modifying the flight path instructions for the modified flight path comprises:
      modifying the flight path instructions based on calculating the modified flight path.

3. The method of claim 1, further comprising:
   providing, to the mobile device, information associated with a current location of the unmanned aerial vehicle in relation to the second location of the mobile device.

4. The method of claim 1, further comprising:
   determining a meeting location for the unmanned aerial vehicle and the mobile device based on the information associated with the second location, the second direction of travel, and the second speed of the mobile device; and calculating the modified flight path from the geographical location to the meeting location based on the capability information, the meeting location corresponding to the second anticipated geographical location associated with the mobile device.

5. The method of claim 4, where the meeting location includes a geographical location associated with a rest stop, a retail store, a parking lot, a restaurant, a grocery store, or a convenience store.

6. The method of claim 4, further comprising:

providing to the mobile device:

information indicating the meeting location, and at least one of a confirmation code or an authentication mechanism that permits the mobile device to authenticate a user of the mobile device so that the user may receive a payload of the unmanned aerial vehicle at the meeting location.

7. The method of claim 1, further comprising:

providing, to the mobile device and for display, navigation information to the second anticipated geographic location.

8. A system, comprising:

one or more devices to:

receive a request for a flight path for an unmanned aerial vehicle to travel from a geographical location to a first anticipated geographical location associated with a mobile device;

determine capability information for the unmanned aerial vehicle based on component information associated with the unmanned aerial vehicle;

receive information associated with a first location, a first direction of travel, and a first speed of the mobile device, the first location being a current location of the mobile device;

calculate the flight path from the geographical location to the first anticipated geographical location based on the capability information and based on the information associated with the first location, the first direction of travel, and the first speed of the mobile device;

generate flight path instructions for the flight path;

provide the flight path instructions to the unmanned aerial vehicle, the unmanned aerial vehicle travelling from the geographical location to the first anticipated geographical location based on the flight path instructions;

receive first feedback information from the unmanned aerial vehicle, the first feedback information including a weather condition;

receive second feedback information from the mobile device, the second feedback information including information associated with:

a second location of the mobile device, the second location being an updated location with respect to the first location, a second direction of travel of the mobile device, the second direction of travel being an updated direction of travel with respect to the first direction of travel, and a second speed of the mobile device, the second speed of the mobile device being an updated speed of the mobile device with respect to the first speed of the mobile device;

determine, based on the first feedback information and the second feedback information, whether the unmanned aerial vehicle is able to travel to the first anticipated geographical location;

modify the flight path instructions for a modified flight path based on determining that the unmanned aerial vehicle is unable to travel to the first anticipated geographical location; and provide modified flight path instructions to the unmanned aerial vehicle, the unmanned aerial vehicle travelling towards a second anticipated geographic location, associated with the mobile device, based on the modified flight path instructions.

9. The system of claim 8, where the modified flight path includes information identifying the second anticipated geographical location;

where the one or more devices are further to:

calculate, based on determining that unmanned aerial vehicle is unable to travel to the first anticipated geographical location, the modified flight path; and where the one or more devices, when modifying the flight path instructions for the modified flight path, are to:

modify the flight path instructions based on calculating the modified flight path.

10. The system of claim 8, where the one or more devices are further to:

provide, to the mobile device, information associated with a current location of the unmanned aerial vehicle in relation to the second location of the mobile device.

11. The system of claim 8, where the one or more devices are further to:

determine a meeting location for the unmanned aerial vehicle and the mobile device based on the information associated with the second location, the second direction of travel, and the second speed of the mobile device; and calculate the modified flight path from the geographical location to the meeting location based on the capability information, the meeting location corresponding to the second anticipated geographical location associated with the mobile device.

12. The system of claim 11, where the meeting location includes a geographical location associated with a retail store, a restaurant, a grocery store, or a convenience store.

13. The system of claim 11, where the one or more devices are further to:

provide to the mobile device:

information indicating the meeting location, and at least one of a confirmation code or an authentication mechanism that permits the mobile device to authenticate a user of the mobile device so that the user may receive a payload of the unmanned aerial vehicle at the meeting location.

14. The system of claim 8, where the one or more devices are further to:

provide, to the mobile device and for display, navigation information to the second anticipated geographic location.

15. A non-transitory computer-readable medium for storing instructions, the instructions comprising:

one or more instructions that, when executed by one or more processors of a device, cause the one or more processors to:
  receive a request for a flight path for an unmanned aerial vehicle to travel from a geographical location to a first anticipated geographical location associated with a mobile device;
  receive information associated with a first location, a first direction of travel, and a first speed of the mobile device,
    the first location being a current location of the mobile device;
  calculate the flight path from the geographical location to the first anticipated geographical location based on the information associated with the first location, the first direction of travel, and the first speed of the mobile device;
  generate flight path instructions for the flight path;
  provide the flight path instructions to the unmanned aerial vehicle,
    the unmanned aerial vehicle travelling from the geographical location to the first anticipated geographical location based on the flight path instructions;
  receive first feedback information from the unmanned aerial vehicle,
    the first feedback information including a weather condition;
  receive second feedback information from the mobile device,
    the second feedback information including information associated with:
      a second location of the mobile device,
        the second location being an updated location with respect to the first location,
      a second direction of travel of the mobile device,
        the second direction of travel being an updated direction of travel with respect to the first direction of travel, and
      a second speed of the mobile device,
        the second speed of the mobile device being an updated speed of the mobile device with respect to the first speed of the mobile device;
  determine, based on the first feedback information and the second feedback information, whether the unmanned aerial vehicle is able to travel to the first anticipated geographical location;
  modify the flight path instructions for a modified flight path based on determining that the unmanned aerial vehicle is unable to travel to the first anticipated geographical location; and
  provide modified flight path instructions to the unmanned aerial vehicle,
    the unmanned aerial vehicle travelling towards a second anticipated geographical location, associated with the mobile device, based on the modified flight path instructions.

16. The non-transitory computer-readable medium of claim 15, where the modified flight path includes information identifying the second anticipated geographical location;

where the one or more instructions, when executed by the one or more processors, further cause the one or more processors to:
  determine that the modified flight path is to be changed based on additional feedback information associated with a change to at least one of a direction of travel or a speed of the mobile device;
  calculate, based on determining that the unmanned aerial vehicle is unable to travel to the first anticipated geographical location, the modified flight path; and
where the one or more instructions, that cause the one or more processors to modify the flight path instructions for the modified flight path, cause the one or more processors to:
  modify the flight path instructions based on calculating the modified flight path.

17. The non-transitory computer-readable medium of claim 15, where the one or more instructions, when executed by the one or more processors, further cause the one or more processors to:
  provide, to the mobile device, information associated with a current location of the unmanned aerial vehicle in relation to the second location of the mobile device.

18. The non-transitory computer-readable medium of claim 15, where the one or more instructions, when executed by the one or more processors, further cause the one or more processors to:
  determine a meeting location for the unmanned aerial vehicle and the mobile device based on the information associated with the second location, the second direction of travel, and the second speed of the mobile device; and
  calculate the modified flight path from the geographical location to the meeting location based on capability information,
    the meeting location corresponding to the second anticipated geographical location associated with the mobile device and including a geographical location associated with a rest stop, a retail store, a parking lot, a restaurant, a grocery store, or a convenience store.

19. The non-transitory computer-readable medium of claim 17, where the one or more instructions, when executed by the one or more processors, further cause the one or more processors to:
  provide to the mobile device:
    information indicating a meeting location, and
    at least one of a confirmation code or an authentication mechanism that permits the mobile device to authenticate a user of the mobile device so that the user may receive a payload of the unmanned aerial vehicle at the meeting location.

20. The non-transitory computer-readable medium of claim 15, where the one or more instructions, when executed by the one or more processors, further cause the one or more processors to:
  provide, to the mobile device and for display, navigation information to the second anticipated geographic location.

* * * * *